United States Patent
Go et al.

(10) Patent No.: US 12,457,659 B2
(45) Date of Patent: Oct. 28, 2025

(54) METHOD AND APPARATUS FOR PERFORMING UPLINK TRANSMISSION AND RECEIVING UPLINK TRANSMISSION IN WIRELESS COMMUNICATION SYSTEM

(71) Applicant: LG ELECTRONICS INC., Seoul (KR)

(72) Inventors: Seongwon Go, Seoul (KR); Jiwon Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 437 days.

(21) Appl. No.: 17/973,185

(22) Filed: Oct. 25, 2022

(65) Prior Publication Data

US 2023/0345568 A1    Oct. 26, 2023

(30) Foreign Application Priority Data

Apr. 21, 2022 (KR) .................. 10-2022-0049397

(51) Int. Cl.
*H04W 76/19*   (2018.01)
*H04B 7/0404*   (2017.01)
*H04B 7/06*   (2006.01)
*H04L 5/00*   (2006.01)
*H04W 8/24*   (2009.01)
(Continued)

(52) U.S. Cl.
CPC .................. *H04W 76/19* (2018.02)

(58) Field of Classification Search
CPC ... H04W 76/19; H04W 72/1268; H04W 8/24; H04W 24/08; H04W 72/23; H04B 7/06964; H04B 7/0639; H04B 7/0695; H04B 7/0408; H04B 7/088; H04L 5/0048; H04L 5/0053; H04L 5/001; H04L 5/0098

See application file for complete search history.

(56) References Cited

U.S. PATENT DOCUMENTS

2018/0287682 A1* 10/2018 Kwak .................. H04W 24/10
2020/0350972 A1* 11/2020 Yi ....................... H04W 74/0833
(Continued)

FOREIGN PATENT DOCUMENTS

JP    2022518400 A    3/2022

OTHER PUBLICATIONS

CATT, "Beam management enhancements for multi-TRP", 3GPP TSG RAN WG1 #105-e, R1-2104486, e-Meeting, May 19-27, 2021.
(Continued)

*Primary Examiner* — Harry H Kim
(74) *Attorney, Agent, or Firm* — BRYAN CAVE LEIGHTON PAISNER LLP

(57) ABSTRACT

A method and apparatus for transmitting and receiving uplink in a wireless communication system are disclosed. A method for uplink transmission for beam failure recovery (BFR) according to an embodiment of the present disclosure includes: receiving, from a base station, configuration information related to BFR, wherein the configuration information includes information on a first beam failure detection (BFD) reference signal (RS) set and a second BFD RS set; assessing radio link quality for at least one of the first BFD RS set and the second BFD RS set; and based on detection of at least one of a first beam failure for the first BFD RS set and a second beam failure for the second BFD RS set, performing uplink transmission for BFR to the base station.

7 Claims, 12 Drawing Sheets

(51) Int. Cl.
  *H04W 24/08* (2009.01)
  *H04W 24/10* (2009.01)
  *H04W 72/1268* (2023.01)
  *H04W 72/21* (2023.01)
  *H04W 72/231* (2023.01)
  *H04W 72/232* (2023.01)

(56) References Cited

U.S. PATENT DOCUMENTS

| | | | | |
|---|---|---|---|---|
| 2023/0088597 A1* | 3/2023 | Alfarhan | ............ | H04B 17/318 370/252 |
| 2023/0141838 A1* | 5/2023 | Long | ............ | H04B 7/0695 375/267 |
| 2023/0319608 A1* | 10/2023 | Matsumura | ............ | H04L 5/0053 370/252 |
| 2024/0129772 A1* | 4/2024 | Laddu | ............ | H04B 7/022 |
| 2024/0172019 A1* | 5/2024 | Sun | ............ | H04B 7/0632 |
| 2024/0322881 A1* | 9/2024 | Khoshnevisan | ..... | H04B 7/0626 |
| 2024/0396613 A1* | 11/2024 | Li | ............ | H04B 17/328 |
| 2024/0429983 A1* | 12/2024 | Paderna | ............ | H04B 7/06968 |
| 2025/0055532 A1* | 2/2025 | Zhao | ............ | H04W 24/10 |

OTHER PUBLICATIONS

CATT, "Remaining issues on beam management for multi-TRP," 3GPP TSG RAN WG1 #107-e, R1-2111224, 7 pages, Nov. 2021.

ZTE, "Remaining issues on beam management for Multi-TRP," 3GPP TSG RAN WG1 Meeting #108-e, R1-2201188, 8 pages, Mar. 2022.

* cited by examiner

METHOD AND APPARATUS FOR PERFORMING UPLINK TRANSMISSION AND RECEIVING UPLINK TRANSMISSION IN WIRELESS COMMUNICATION SYSTEM

CROSS-REFERENCE TO RELATED APPLICATIONS

This application claims the benefit of earlier filing date and right of priority to Korean Application No. 10-2022-0049397, filed on Apr. 21, 2022, the contents of which are all hereby incorporated by reference herein in their entirety.

TECHNICAL FIELD

The present disclosure relates to a wireless communication system, and in more detail, relates to a method and an apparatus of transmitting and receiving uplink for beam failure recovery in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and apparatus for supporting both a cell-specific beam failure detection/recovery procedure and a transmission reception point (TRP)-specific beam failure detection/recovery procedure for a specific cell or cell group, etc.

In addition, an additional technical object of the present disclosure is to provide a method and an apparatus of activating a reference signal used for beam failure detection when a plurality of reference signals in a beam failure detection reference signal set corresponding to each TRP are configured.

The technical objects to be achieved by the present disclosure are not limited to the above-described technical objects, and other technical objects which are not described herein will be clearly understood by those skilled in the pertinent art from the following description.

Technical Solution

A method of performing uplink transmission for beam failure recovery (BFR) in a wireless communication system according to an aspect of the present disclosure may include: receiving, from a base station, configuration information related to BFR, wherein the configuration information includes information on a first beam failure detection (BFD) reference signal (RS) set and a second BFD RS set; assessing radio link quality for at least one of the first BFD RS set and the second BFD RS set; and based on detection of at least one of a first beam failure for the first BFD RS set and a second beam failure for the second BFD RS set, performing uplink transmission for BFR to the base station. Based on one or more BFD RSs being activated in each of the first BFD RS set and the second BFD RS set by control information for activation or the configuration information, the radio link quality may be assessed by using the activated one or more BFD RSs.

A method of receiving uplink transmission for beam failure recovery (BFR) in a wireless communication system according to an additional aspect of the present disclosure may include: transmitting, to a terminal configuration information related to BFR, wherein the configuration information includes information on a first beam failure detection (BFD) reference signal (RS) set and a second BFD RS set; and based on detection of at least one of a first beam failure for the first BFD RS set and a second beam failure for the second BFD RS set according to assessment radio link quality for at least one of the first BFD RS set and the second BFD RS set by the terminal, receiving uplink transmission for BFR from the terminal. Based on one or more BFD RSs being activated in each of the first BFD RS set and the second BFD RS set by control information for activation or the configuration information, the radio link quality may be assessed by using the activated one or more BFD RSs.

Advantageous Effects

According to an embodiment of the present disclosure, both a cell-specific beam failure detection/recovery procedure and a transmission reception point (TRP)-specific beam failure detection/recovery procedure for a specific cell or cell group can be supported.

In addition, according to an embodiment of the present disclosure, even if a plurality of beam failure detection reference signal sets are configured corresponding to multiple TRPs and one or more reference signals are configured in each set, as one or more specific reference signals used for beam failure detection are activated, ambiguity in an operation of a terminal with respect to the beam failure detection/recovery procedure can be prevented.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
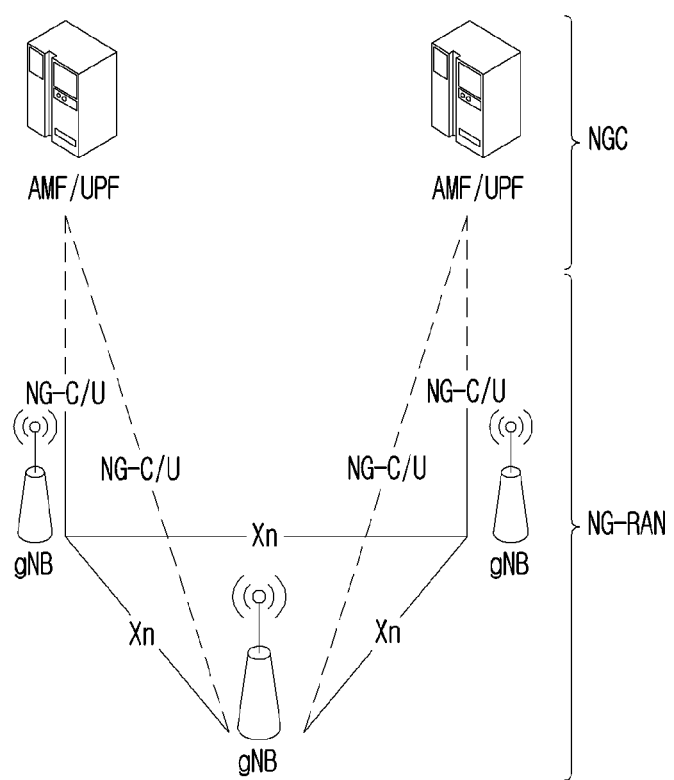
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.
- BM: beam management
- CQI: Channel Quality Indicator
- CRI: channel state information—reference signal resource indicator
- CSI: channel state information
- CSI-IM: channel state information—interference measurement
- CSI-RS: channel state information—reference signal
- DMRS: demodulation reference signal
- FDM: frequency division multiplexing
- FFT: fast Fourier transform
- IFDMA: interleaved frequency division multiple access
- IFFT: inverse fast Fourier transform
- L1-RSRP: Layer 1 reference signal received power
- L1-RSRQ: Layer 1 reference signal received quality
- MAC: medium access control
- NZP: non-zero power
- OFDM: orthogonal frequency division multiplexing
- PDCCH: physical downlink control channel
- PDSCH: physical downlink shared channel
- PMI: precoding matrix indicator
- RE: resource element
- RI: Rank indicator
- RRC: radio resource control
- RSSI: received signal strength indicator
- Rx: Reception
- QCL: quasi co-location
- SINR: signal to interference and noise ratio
- SSB (or SS/PBCH block): Synchronization signal block (including PSS (primary synchronization signal), SSS (secondary synchronization signal) and PBCH (physical broadcast channel))
- TDM: time division multiplexing
- TRP: transmission and reception point
- TRS: tracking reference signal
- Tx: transmission
- UE: user equipment
- ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
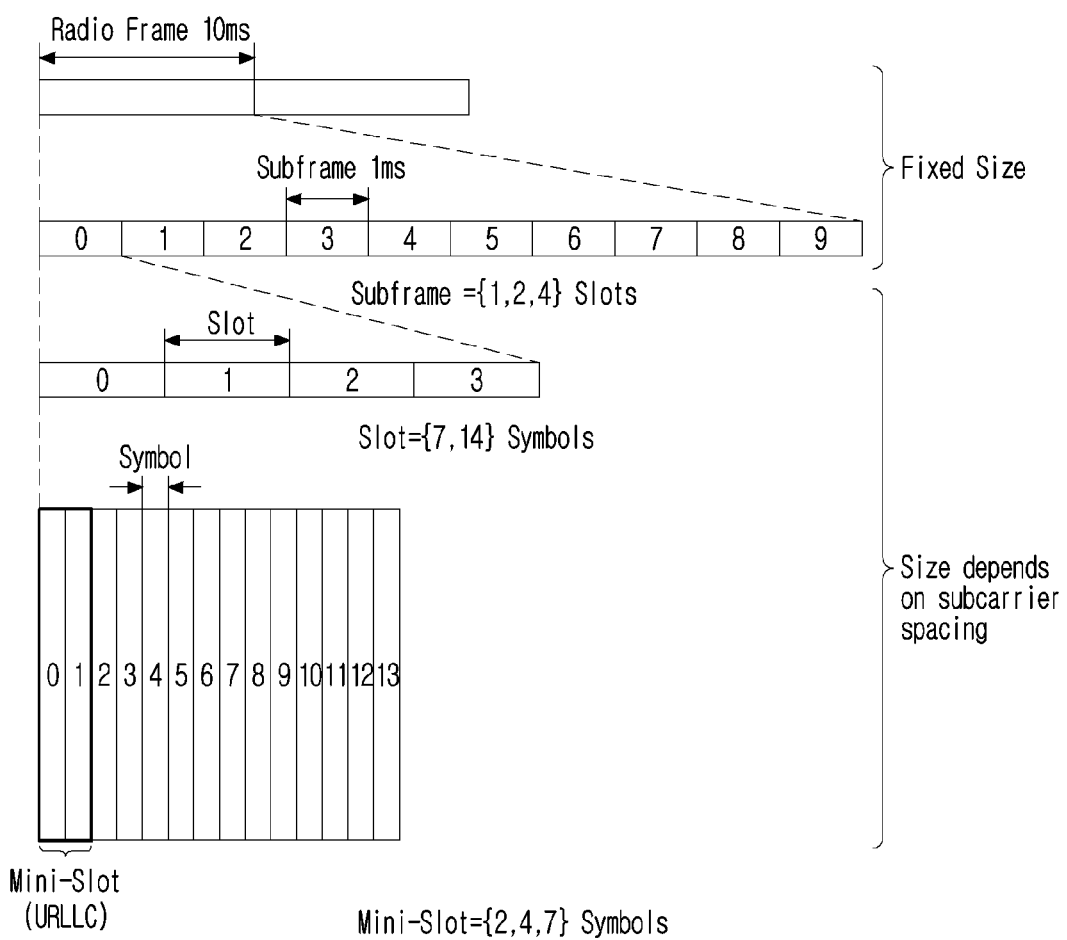
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} \cdot N_f/100) \cdot T_c=10$ ms. Here, a radio frame is configured with 10 subframes having a duration of $T_{sf}=(\Delta f_{max} \cdot N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu} N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
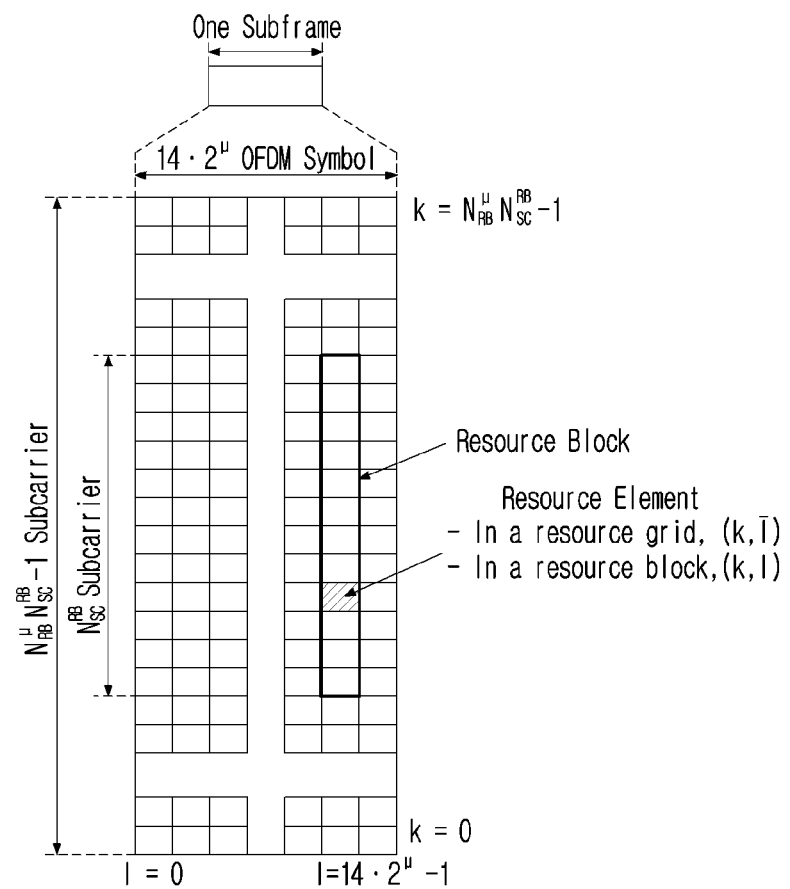
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{cc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k, l'). Here, k=0, ..., $N_{RB}^{\mu} N_{sc}^{RB}-1$ is an index in a frequency domain and l'=0, ..., $2^{\mu} N_{symb}^{(\mu)}-1$ refers to a position of a symbol in a subframe. When referring to a resource element in a slot, an index pair (k,l) is used. Here, l=0, ..., $N_{symb}^{\mu}-1$. A resource element (k,l') for μ and an antenna port p corresponds to a complex value, $a_{k,l}^{(p,\mu)}$. When there is no risk of confusion or when a specific antenna port or numerology is not specified, indexes p and μ may be dropped, whereupon a complex value may be $a_{k,l}^{(p)}$ or $a_{k,l}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu}=n_{PRB}^{\mu}+N_{BWP,i}^{start,\mu} \quad \text{[Equation 2]}$$

$N_{BWP,i}^{start,\mu}$ is a common resource block that a BWP starts relatively to common resource block 0.

Figure 4:
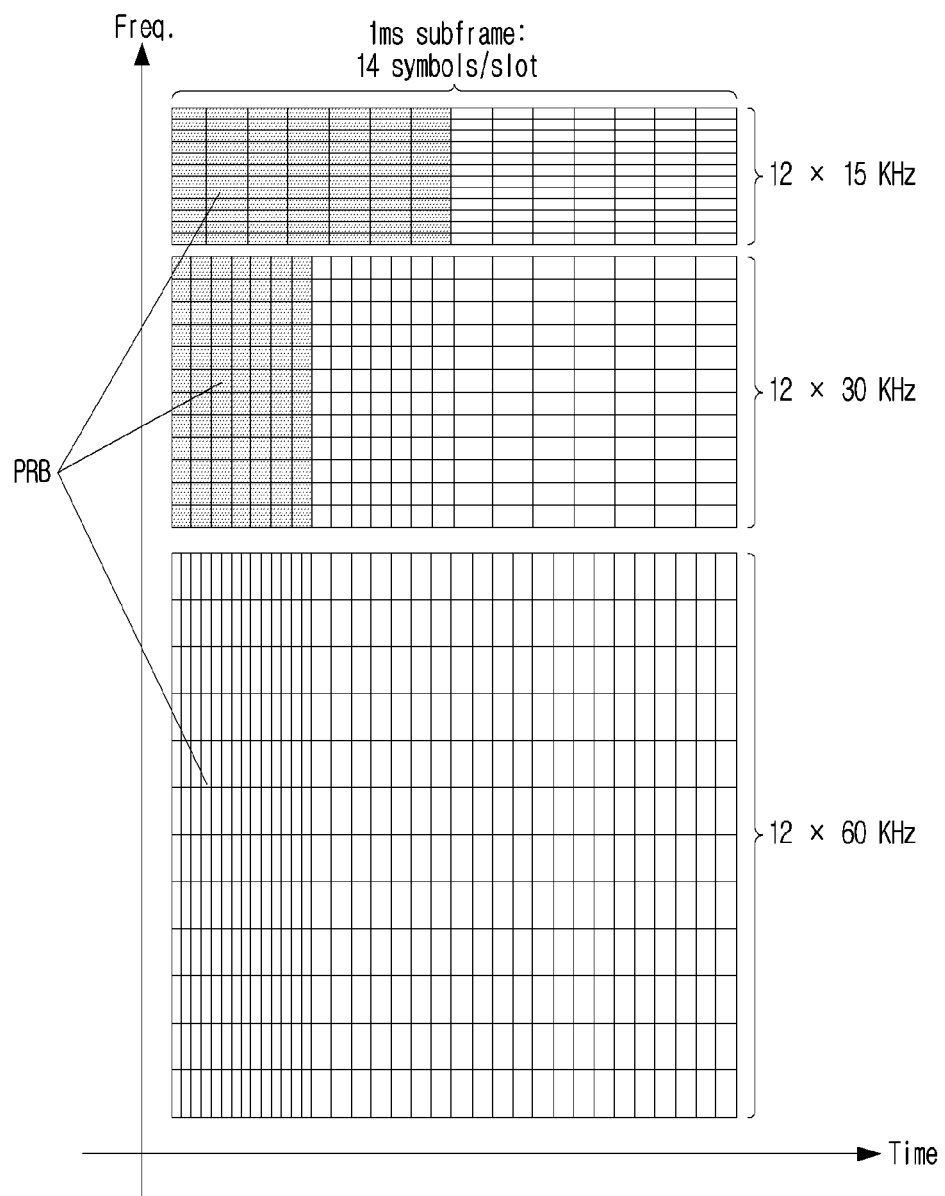
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
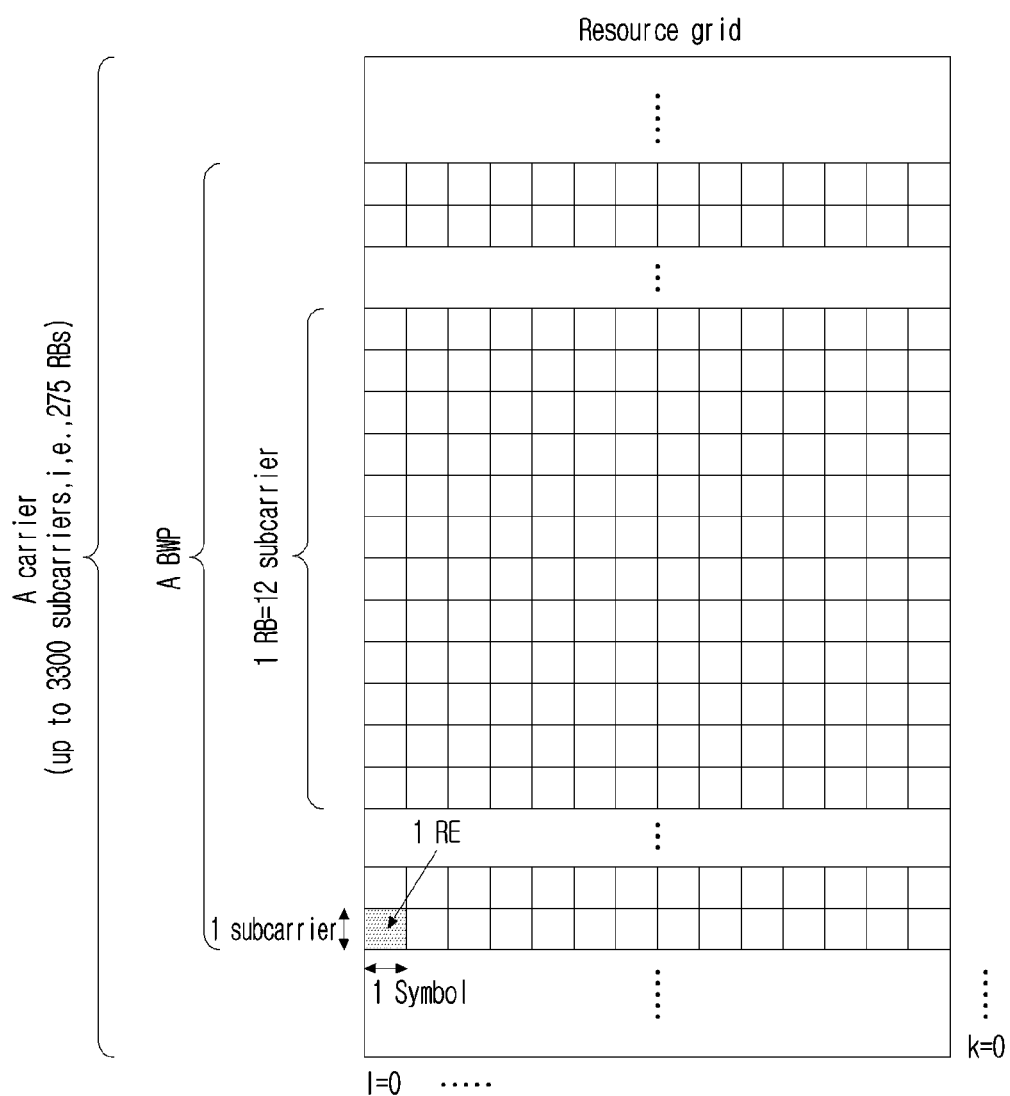
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
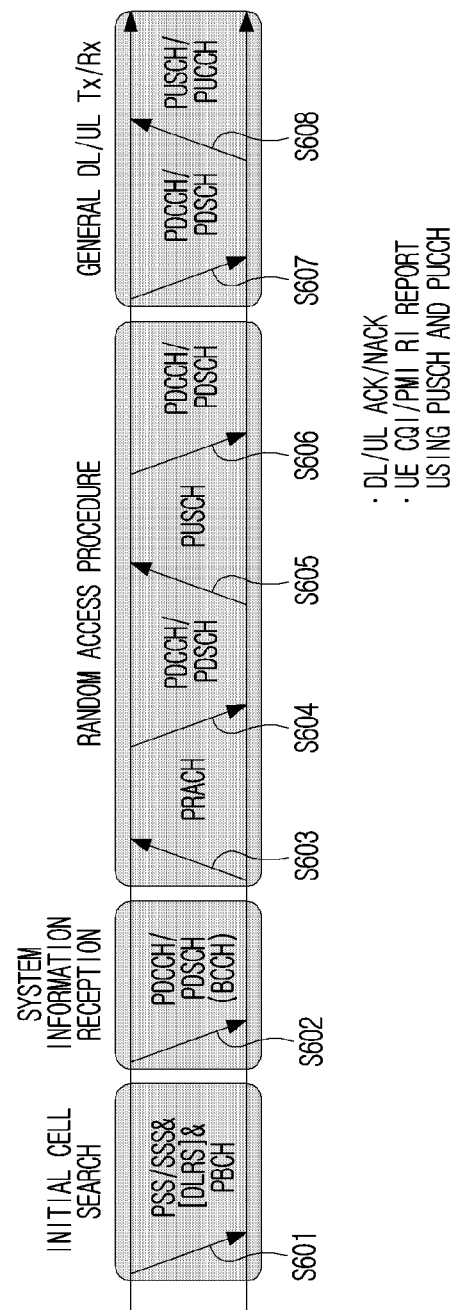
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 10, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A quasi co-location type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port(s) is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Beam Failure Recovery

In performing a DL/UL beam management process, a beam mismatch problem may occur according to a configured beam management cycle. In particular, when a terminal moves or revolves or when a wireless channel environment is changed by the movement of a surrounding object (e.g., a beam is blocked to change a LoS (line-of sight) environment into a Non-LoS environment), the optimum DL/UL beam pair may be changed. Due to such a change, when tracking fails in a beam management process generally performed by a network indication, a beam failure event may be considered to occur. Whether such a beam failure event occurs may be determined by a terminal through reception quality of a downlink reference signal (RS). And, a reporting message for such a situation or a message for a beam recovery request (referred to as a BFRQ (beam failure recovery request) message) should be transmitted from a terminal. A base station which received such a beam failure recovery request message may perform beam recovery through a variety of processes such as beam RS transmission, beam reporting request, etc. for beam recovery. These series of beam recovery processes are referred to as beam failure recovery (BFR). A Rel-15 NR standardized a BFR (beam failure recovery) process for a primary cell (PCell) or a primary secondary cell (PScell) (the two are collectively referred to as a special cell (SpCell)) that a contention based PRACH resource always exists. As an operation in a serving cell, a corresponding BFR procedure is configured as follows with a beam failure detection (BFD) process of a terminal, a BFRQ process, and a process in which a terminal monitors a response of a base station to a BFRQ.

Figure 7:
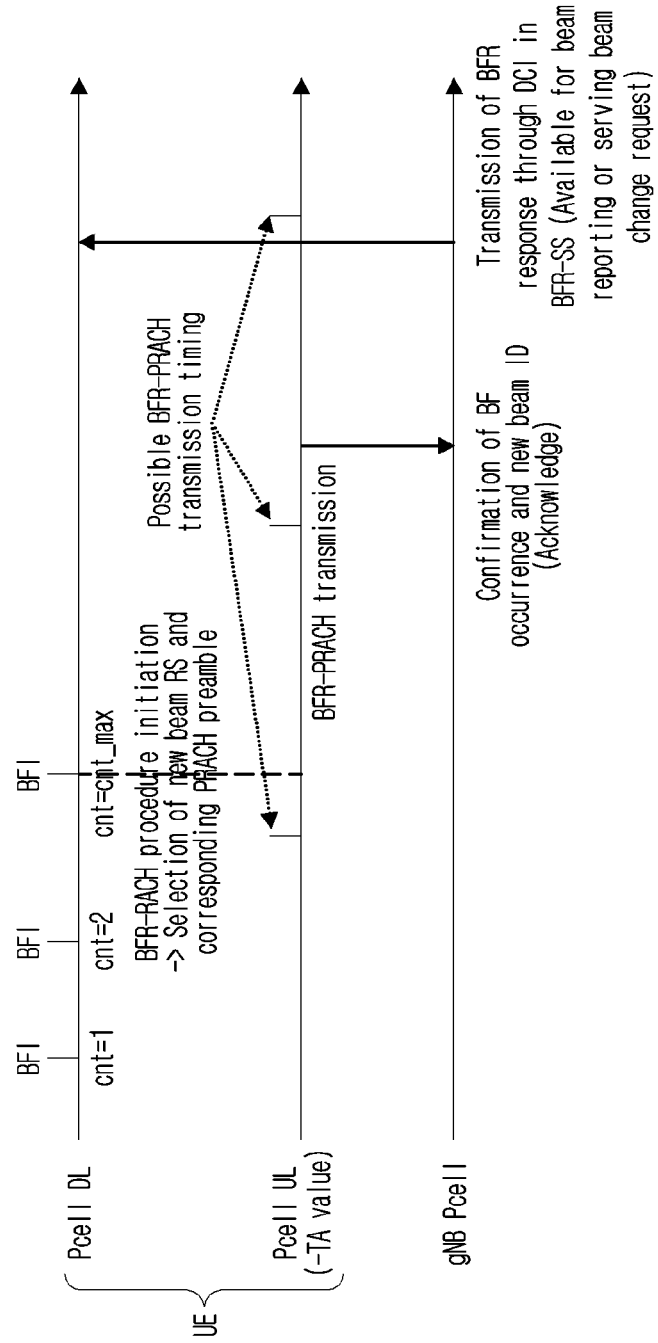
FIG. 7 is a diagram which illustrates a beam failure recovery operation for a Pcell in a wireless communication system to which the present disclosure may be applied.

FIG. 7 is a diagram which illustrates a beam failure recovery operation for a Pcell in a wireless communication system to which the present disclosure may be applied.

Hereinafter, in reference to FIG. 7, a beam failure recovery operation is described.

1) BFD (Beam Failure Detection)

When all PDCCH beams fall below a predetermined quality value (Q_out), it is said that one beam failure instance occurred. Here, quality is based on a hypothetical block error rate (BLER). In other words, it means a probability of a failure in demodulation of corresponding information when it is assumed that control information was transmitted to a corresponding PDCCH.

Here, one or a plurality of search spaces for monitoring a PDCCH may be configured to a terminal. Here, a beam may be differently configured per each search space. In this case, it means a case that all PDCCH beams for all search spaces fall below a BLER threshold. As a method for a terminal to determine a BFD RS, the following two methods are supported.

An implicit configuration for BFD RS(s): a CORESET (control resource set) ID (identifier), a resource region where a PDCCH may be transmitted, is configured in each search space. And, QCLed (Quasi Co-located) RS information for a spatial RX parameter (e.g., a CSI-RS resource ID, a SSB ID) may be indicated/configured per each CORESET ID. For example, a QCLed RS is indicated/configured by a TCI (transmit configuration information) indication in a NR standard. Here, a QCLed RS for a spatial RX parameter (e.g., QCL type D in TS38.214) means that a base station informs that a terminal equally uses (or may use) a beam used to receive a corresponding spatially QCLed RS (i.e., use the same spatial domain filter for reception) in receiving a corresponding PDCCH DMRS. Finally, from a viewpoint of a base station, it is a method of informing a terminal that transmission will be performed by applying the same transmission beam or a similar transmission beam (e.g., when a beam direction is same/similar, but a beam width is different) between spatially QCLed antenna ports. In other words, as described above, a terminal may determine (i.e., consider as the 'all PDCCH beams') as a BFD RS a QCLed (Quasi Co-located) RS for a spatial RX parameter configured to a CORESET for PDCCH reception.

An explicit configuration for BFD RS(s): a base station may explicitly configure beam RS(s) to a terminal for the purpose (beam failure detection). In this case, corresponding configured beam RS(s) correspond to the 'all PDCCH beams'.

Whenever an event occurs that a hypothetical BLER measured based on BFD RS(s) deteriorates over a specific threshold, a physical layer of a terminal informs a MAC sublayer that a beam failure instance (BFI) occurred. In a MAC sublayer of a terminal, when as many BFIs as the certain number of times (e.g., a value of a higher layer parameter, beamFailureInstanceMaxCount) occur within a certain time (i.e., within a BFD timer), a beam failure is determined (considered) to occur and a relevant RACH operation is initiated.

A MAC object operates as follows:

1> If a BFI is received from a lower layer (e.g., a physical layer):

2> Start or restart a BFD timer (beamFailureDetectionTimer);

2> Increase (increment) a BFI counter (BFI_COUNTER) by 1;

2> If a BFI counter (BFI_COUNTER) is equal to or greater than the maximum count (number of times) of BFIs (beamFailureInstanceMaxCount):

3> Initiate a Random Access procedure in a SpCell (refer to the above-described Random Access related procedure).

1> If a BFD timer (beamFailureDetectionTimer) is expired; or

1> If a BFD timer (beamFailureDetectionTimer), the maximum count (number of times) of BFIs (beamFailureInstanceMaxCount), or any reference signals used for beam failure detection is reconfigured by a higher layer (e.g., a RRC layer):

2> Set a BFI counter (BFI_COUNTER) as 0.

1> If a Random Access procedure is successfully completed:

2> Set a BFI counter (BFI_COUNTER) as 0;

2> If configured, stop a beam failure recovery timer (beamFailureRecoveryTimer);

2> Consider that a Beam Failure Recovery procedure was successfully completed 2) (PRACH based) Beam Failure Recovery Request (BFRQ) New Beam Identification+PRACH Transmission As described in 1) Beam Failure Detection (BFD), when a certain number of BFIs or more occur, a terminal may determine that a beam failure occurred and perform a beam failure recovery operation. As an example of a Beam failure recovery operation, a beam failure recovery request (BFRQ) operation based on a RACH procedure (i.e., a PRACH) may be performed. Hereinafter, a corresponding BFRQ procedure is described in detail.

A base station may configure a RS list (e.g., candidate-BeamRSList) corresponding to candidate beams which may be substituted when a beam failure (BF) occurs through higher layer signaling (e.g., RRC) for a corresponding terminal. In addition, dedicated PRACH resources may be configured for corresponding candidate beams. Here, dedicated PRACH resources are non-contention based PRACH (also referred to as contention free PRACH) resources. If a terminal does not find a (proper) beam in a corresponding list, a terminal selects a contention based PRACH among preconfigured SSB resources and transmits it to a base station. A specific procedure is as follows.

Step 1) A terminal finds a beam with more than a predetermined quality value (Q_in) among RSs configured by a base station as a candidate beam RS set.

If one beam RS exceeds a threshold, a terminal selects a corresponding beam RS.

If a plurality of beam RSs exceeds a threshold, a terminal selects any one of corresponding beam RSs.

If no beam exceeds a threshold, a terminal performs the following step 2.

Here, beam quality may be based on a RSRP.

In addition, a RS beam set configured by the base station may include the following three cases. For example, all beam RSs in a RS beam set may be configured with SSBs. Alternatively, all beam RSs in a RS beam set may be configured with CSI-RS resources. Alternatively, beam RSs in a RS beam set may be configured with SSBs and CSI-RS resources.

Step 2) A terminal finds a beam with more than a predetermined quality value (Q_in) or more among SSBs (associated with a contention based PRACH resource).

If one SSB exceeds a threshold, a terminal selects a corresponding beam RS.

If a plurality of SSBs exceeds a threshold, a terminal selects any one of corresponding beam RSs.

If no beam exceeds a threshold, a terminal performs the following step 3.

Step 3) A terminal selects any SSB among SSBs (associated with a contention based PRACH resource).

A terminal transmits to a base station a preamble and a PRACH resource which is directly or indirectly associated and configured with a beam RS (CSI-RS or SSB) selected in the process.

Here, a direct association configuration is used in the following case.

When a contention-free PRACH resource and a preamble are configured for a specific RS in a candidate beam RS set which is separately configured for BFR When a preamble and a (contention based) PRACH resource mapped one-to-one with SSBs which are commonly configured for other purposes such as random access, etc. are configured Alternatively, here, an indirect association configuration is used in the following case.

When a contention-free PRACH resource and a preamble are not configured for a specific CSI-RS in a candidate beam RS set which is separately configured for BFR Here, a terminal selects a preamble and a (contention free) PRACH resource associated with a SSB (i.e., QCLed (quasi-co-located) with respect to a spatial Rx parameter) designated to be receivable with the same Rx beam as a corresponding CSI-RS.

3) Monitoring of a Response of a Base Station to a BFRQ

A terminal monitors a response of a base station (gNB) to corresponding PRACH transmission.

Here, a response to the contention-free PRACH resource and preamble is transmitted to a PDCCH masked by a C-RNTI and a response is received in a search space (SS) which is separately configured by RRC for BFR.

Here, the search space is configured for a specific CORESET (for BFR).

For a response to a Contention PRACH, a search space and a CORESET (e.g., CORESET 0 or CORESET 1) configured for a general contention PRACH based random access process are reused as they are.

If there is no response for a certain period of time, 2) a process of identifying and selecting a new beam, and 3) a process of monitoring a response of a base station and a BFRQ are repeated.

The process may be performed until PRACH transmission reaches the preconfigured maximum number of times (N_max) or a configured timer (BFR timer) expires.

If the timer expires, a terminal stops contention free PRACH transmission, but may perform contention based PRACH transmission by a SSB selection until N_max is reached.

Improved Beam Failure Recovery (Rel-16)

As described above, Rel-15 NR standardized a PRACH based BFR process. However, it is applied only to a PCell or a PSCell due to a technical limit that any SCell may have no UL carrier in CA (carrier aggregation) and although there is a UL carrier, a contention based PRACH may not be configured. Such a limit has a limit that especially, when a SCell is operated in a high frequency band (e.g., 30 GHz) while operating a PCell in a low frequency band (e.g., below 6 GHz), BFR may not be supported in a high frequency band where BFR is actually needed. For this reason, standardization for BFR support on a SCell is performed in a Rel-16 NR MIMO work item. So far, as a result of a standardization discussion, UL transmission to a corresponding SCell is impossible at least for a DL only SCell, so it is planned to configure (dedicated) PUCCH resource(s), which are used for informing a base station that SCell beam failure occurred, in a SpCell and use it to perform a BFRQ for a SCell. Hereinafter, for convenience, the PUCCH is referred to as a BFR-PUCCH.

As described above, an object of a BFR-PRACH standardized in Rel-15 is to transmit 'occurrence of beam failure+new beam RS (set) information' together to a base station. Meanwhile, an object of a BFR-PUCCH is to inform only 'occurrence of beam failure to SCell(s)'. And, to which SCell(s) beam failure occurred (e.g., CC index(es)), whether there is a new beam for corresponding SCell(s) and a corresponding beam RS ID when there is a new beam (and quality (s) (e.g., a RSRP or a SINR) of corresponding beam RS(s)) may be reported as a subsequent MAC-CE (or UCI). Here, a subsequent beam report is not necessarily triggered all the time and it is possible to deactivate SCell(s) which are BFR configured for a corresponding terminal after a base station receives a BFR-PUCCH. A reason for such a design is because dozens of SCells may be associated with one PCell/PSCell and because from a viewpoint of a base station, there may be a lot of terminals sharing one PCell/PSCell UL, and considering even such a case, it is desirable to minimize the amount of UL resources reserved for a SCell BFRQ to each terminal in a PCell/PSCell.

CORESET (Control Resource Set) Control Resource Set)

A CORESET Information Element (IE) is used to configure a time/frequency CORESET for searching for downlink control information.

Table 6 illustrates a CORESET IE.

TABLE 6

```
-- ASN1START
-- TAG-CONTROLRESOURCESET-START
ControlResourceSet ::=          SEQUENCE {
    controlResourceSetId            ControlResourceSetId,
    frequencyDomainResources        BIT STRING (SIZE (45)),
    duration                        INTEGER (1..maxCoReSetDuration),
    cce-REG-MappingType             CHOICE {
        interleaved                     SEQUENCE {
            reg-BundleSize                  ENUMERATED {n2, n3, n6},
            interleaverSize                 ENUMERATED {n2, n3, n6},
            shiftIndex                      INTEGER(0..maxNrofPhysicalResourceBlocks-1)
OPTIONAL -- Need S
        },
        nonInterleaved                  NULL
    },
    precoderGranularity             ENUMERATED {sameAsREG-bundle, allContiguousRBs},
    tci-StatesPDCCH-ToAddList       SEQUENCE(SIZE (1..maxNrofTCI-StatesPDCCH)) OF TCI-
StateId OPTIONAL, -- Cond NotSIB1-initialBWP
    tci-StatesPDCCH-ToReleaseList   SEQUENCE(SIZE (1..maxNrofTCI-StatesPDCCH)) OF TCI-
StateId OPTIONAL, -- Cond NotSIB1-initialBWP
    tci-PresentInDCI                ENUMERATED {enabled}
OPTIONAL, -- Need S
    pdcch-DMRS-ScramblingID         INTEGER (0..65535)
OPTIONAL, -- Need S
    ...
}
-- TAG-CONTROLRESOURCESET-STOP
-- ASN1STOP
```

The following table 7 is a table which describes a field in a CORESET IE.

TABLE 7

Description on a CORESET IE field cce-REG-MappingType
Mapping of CCEs (control channel element) with REGs (resource element group)
controlResourceSetId
A value of 0 identifies a common CORESET (CORESET0, controlResourceSetZero) configured in a serving cell common configuration (ServingCellConfigCommon) or in a MIB (master information block) and is not used in this CORESET IE. A value of 1 to maxNrofControlResourceSets-1 identifies CORESETs configured by dedicated signaling or SIB1 (system information block 1). controlResourceSetId is unique among BWPs of a serving cell.
duration
Consecutive time duration of a CORESET in number of symbols (duration)
frequencyDomainResources
Frequency domain resources for a CORESET. Each bit corresponds to a group of 6 RBs grouped starting from a first RB group in a BWP. A first (leftmost/most significant) bit corresponds to a first RB group in a BWP, and so on. A bit set as 1 indicates that this RB group belongs to a frequency domain resource of this CORESET. A bit corresponding to a group of RBs which are not entirely included in a BWP where a CORESET is configured is set as 0.
interleaverSize
Interleaver-Size
pdcch-DMRS-ScramblingID
Initialize PDCCH DMRS Scrambling. When this field is absent, TABLE 7-continued Description on a CORESET IE field UE applies a value of a physical cell identifier (physCellId) configured for this serving cell.
precoderGranularity
Precoder granularity in a frequency domain
reg-BundleSize
Resource element groups (REG) may be bundled to generate REG bundles. This parameter defines a size of such bundles.
shiftIndex
When this field is absent, UE applies a value of a physical cell identifier (physCellId) configured for this serving cell.
tci-PresentInDCI
This field indicates whether there is a TCI (transmission configuration indicator) field in DL-related DCI. When this field is absent, UE considers TCI to be absent/disabled. For cross carrier scheduling, a network sets this field to be used for a CORESET used for cross carrier scheduling in a scheduling cell.
tci-StatesPDCCH-ToAddList
A subset of TCI states defined in a PDSCH configuration (pdsch-Config) included in a DL BWP to which a CORESET belongs and a downlink dedicated BWP (BWP-DownlinkDedicated) corresponding to a serving cell. It is used to provide a QCL relation between PDCCH DMRS ports and DL RS(s) in one RS set (TCI state). A network configures an entry of the maximum number of PDCCH TCI states (maxNrofTCI-StatesPDCCH).
NotSIB1-initialBWP
This field is a field subject to conditional presence. When SIB1 is broadcast, this field is absent in a PDCCH common configuration (PDCCH-ConfigCommon) of a first BWP in SIB1 and a serving cell common configuration (ServingCellConfigCommon). Otherwise, it is optionally present.

A CORESET identifier (ControlResourceSetId) IE is related to a short identifier (short identity) used to identify a CORESET in a serving cell. ControlResourceSetId=0 identifies ControlResourceSet #0 configured through a PBCH (MIB) and controlResourceSetZero (serving cell common configuration (ServingCellConfigCommon)). An ID space is used in BWPs of a serving cell. The number of CORESETs per BWP is limited to 3 (including a common CORESET and a UE-specific CORESET).

Table 8 illustrates a ControlResourceSetId IE.

TABLE 8

-- ASN1START
-- TAG-CONTROLRESOURCESETID-START
ControlResourceSetId ::= INTEGER (0..maxNrofControlResourceSets-1)
-- TAG-CONTROLRESOURCESETID-STOP
-- ASN1STOP A CORESET zero (ControlResourceSetZero) IE is used to configure CORESET #0 of a first BWP.

Table 9 illustrates a ControlResourceSetZero IE.

TABLE 9

-- ASN1START
-- TAG-CONTROLRESOURCESETZERO-START
ControlResourceSetZero ::= INTEGER (0..15)
-- TAG-CONTROLRESOURCESETZERO-STOP
-- ASN1STOP Operation Related to Multi-TRPs A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH) transmitted to different panels belonging to the same TRP.

In addition, an MTRP-URLLC may mean that the same TB (Transport Block) is transmitted using different layers/time/frequencies of M-TRPs. A UE configured with an MTRP-URLLC transmission method may be indicated with multiple TCI state(s) by DCI, and it may be assumed that data received using a QCL RS of each TCI state is the same TB. On the other hand, an MTRP-eMBB may mean that different TBs are transmitted using different layers/time/frequencies by M-TRPs. A UE configured with an MTRP-eMBB transmission method is indicated by several TCI state(s) by DCI, and it may be assumed that data received using a QCL RS of each TCI state are different TBs. In this regard, as a UE separates and uses an RNTI configured for an MTRP-URLLC purpose and an RNTI configured for an MTRP-eMBB purpose, it may be decided/determined whether corresponding M-TRP transmission is URLLC transmission or eMBB transmission. That is, when CRC masking of DCI received by a UE is performed using an RNTI configured for an MTRP-URLLC purpose, this may correspond to URLLC transmission, and CRC masking of DCI is performed using an RNTI configured for an MTRP-eMBB purpose, this may correspond to eMBB transmission.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

For example, a higher layer parameter ControlResourceSet information element (IE) is used to configure a time/frequency control resource set (CORESET). For example, the control resource set (CORESET) may be related to detection and reception of downlink control information. The ControlResourceSet IE may include a CORESET-related ID (e.g., controlResourceSetID)/an index of a CORESET pool for a CORESET (e.g., CORESETPoolIndex)/a time/frequency resource configuration of a CORESET/TCI information related to a CORESET, etc. As an example, an index of a CORESET pool (e.g., CORESETPoolIndex) may be set to 0 or 1. In the above description, a CORESET group may correspond to a CORESET pool, and a CORESET group ID may correspond to a CORESET pool index (e.g., CORESETPoolIndex).

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 8:
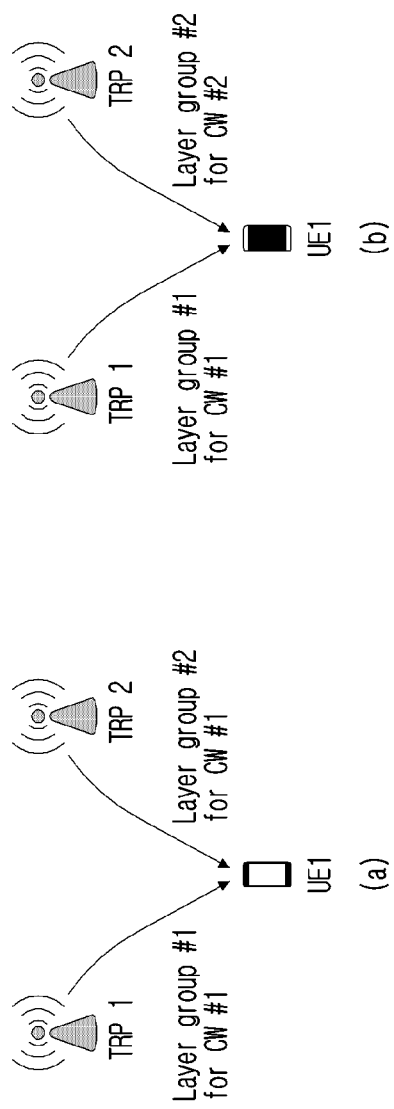
FIG. 8 illustrates a method of multiple TRPs transmission in a wireless communication system to which the present disclosure may be applied.

FIG. 8 illustrates a method of multiple TRPs transmission in a wireless communication system to which the present disclosure may be applied.

In reference to FIG. 8(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 8(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 8(b), it may have a disadvantage that a code rate corresponding to a TB is higher compared to FIG. 8(a). However, it has an advantage that it may adjust a code rate by indicating a different RV (redundancy version) value or may adjust a modulation order of each CW for encoded bits generated from the same TB according to a channel environment.

According to methods illustrated in FIG. 8(a) and FIG. 8(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Beam Failure Recovery (BFR) Method

The above-described contents (3GPP system, frame structure, NR system, beam failure recovery procedure (Rel-15/16), etc.) may be applied in combination with the methods proposed in the present disclosure to be described below, or may be supplemented to clarify technical characteristics of the methods proposed in the present disclosure. The methods to be described below are only divided for convenience of description, and some components of one method may be substituted with some components of another method, or may be applied in combination with each other.

In the present disclosure, '/' means 'and', 'or', or 'and/or' depending on the context.

Standardization for the TRP-specific BFR scheme in NR Rel-17 FeMIMO was progressed. Unlike the existing Rel-15/16 BFR procedure, in Rel-17 TRP specific BFR, it has been enhanced so that up to two BFD-RS sets for beam failure monitoring/detection (corresponding to a specific TRP) in CC/BWP for a UE (set) can be configured.

That is, a specific BFD-RS set may explicitly/implicitly correspond to a specific TRP. As an example, a PUCCH resource related to a specific TRP may be interpreted as a PUCCH resource related to a specific BFD-RS set.

In addition, as beam failure (BF) occurs/is detected in a specific BFD-RS set, a procedure was defined for subsequent BFRQ operation and BFR MAC CE transmission. In addition, it was agreed that an NBI-RS set for configuring a candidate beam for new beam identification (NBI) may be TRP-specifically configured. As an example, an NBI-RS set associated with (corresponding to) each BFD-RS set may be configured.

When TRP-specific BF is declared, for a BFRQ PUCCH-SR resource for informing the corresponding BF (or BFR), it was agreed to support a UE to inform a base station through PUCCH resources of up to two resources in a cell group. If two TRP-specific BFD-RS sets are configured in a special cell (SpCell) (=PCell+PSCell), when TRP-specific BF occurs in a specific BFD-RS set, a terminal utilizes a PUCCH-SR resource associated/corresponding to the corresponding BFD-RS set for BFRQ transmission. In addition, for a BFR MAC CE that can carry information on TRP-specific BF, a BFR MAC CE message format is being enhanced to carry a CC index where TRP-specific BF occurred, a BFD-RS set index where BF occurred, whether a new beam is found in an NBI-RS set corresponding to a BFD-RS set in which BF has occurred, (a new beam was found case) NBI-RS information, etc. (Refer to the agreement on Rel-17 M-TRP BM in Table 10 below)

Table 10 illustrates Rel-17 M-TRP BM related agreement with respect to TRP-specific BFR.

TABLE 10

Agreement
For M-TRP BFR
- Support 2 BFD-RS sets per BWP, and up to N resources per BFD-RS set
    FFS: value of N (e.g. fixed in specification, or UE capability)
- FFS: number of BFD RSs across all BFD-RS sets per DL BWP (e.g. fixed maximum value or UE capability)
Agreement
For M-TRP BFR
Support 1-to-1 association between each BFD-RS set and an NBI-RS set
- FFS: Association details
Agreement
BFRQ response
- Support at least the same gNB response as in Rel.16 SCell BFR (i.e. DCI with toggled NDI scheduling a same HARQ process ID as the PUSCH carrying BFRQ MAC-CE)
Agreement
For BFRQ of M-TRP BFR
- Option 3: Up to two dedicated PUCCH-SR resources in a cell group
- FFS: Whether PUCCH-SR for SCell can be reused for M-TRP
- Support BFRQ MAC-CE that can convey information of failed CC indices, one new candidate beam for the failed TRP/CC (if found), and whether new candidate beam is found
    Support at least indication of a single TRP failure
        FFS: whether/what information of failed TRP(s) is conveyed in the MAC-CE
        FFS: whether/how to support indication of more than one TRP failure, corresponding BFR procedure, and applicable cell type (SCell vs. SpCell)
- FFS: UE behavior when TRP failure status is different across cells
- FFS: Whether PUCCH SR resource can be configured with 2 spatial relations
Agreement
For multi-TRP BFR, a single MAC-CE is used at least for BFRQ for all TRPs in all CCs in a cell group, which includes
-    Indices of failed BFD-RS set (as an indication of failed TRP link)
-    Indices of CC containing the failed TRP link
-    An indicator whether a new candidate beam is identified in the NBI-RS set associat ed with the failed BFD-RS set, and an resource indicator representing the new candid ate beam (if identified) based on the number of NBI-RS resources in the correspondin g NBI-RS set.
-    FFS: Content of MAC-CE related to SpCell when transmitted on msg3, msgA
-    Note: MAC-CE signaling design details are up to RAN2
-    The term "failed TRP link" is used here for discussion purposes only
Agreement
The maximum number of BFD-RS resources per set is a UE capability, including a p ossible candidate value of 1 in Rel.17.
Agreement
Support the following BFD-RS configurations in Rel.17 for UEs with one activated T CI state per CORESET:
- Implicit configuration:
    M-DCI:
    BFD-RS set k (k = 0, 1) is derived based on X TCI of CORESETs with CORESETPoolIndex = k
        FFS: value of X (determined in spec or UE capability), and TCI selection rule when the number of CORESETs with CORESETPoolIndex = k exceeds X (e.g. reuse RLM RS selection rule)
- FFS: CORESETs with more than 1 activated TCI states
Agreement
Support the following BFD-RS configurations in Rel.17 for UEs with one activated TCI state per CORESET:
- Explicit configuration of BFD-RS resources in BFD-RS set k, k = 0, 1
- FFS: CORESETs with more than 1 activated TCI state.
Agreement
RACH-based transmission can be triggered on a SpCell at least in the following scenarios
- Scenario 1: When beam failure is detected on all BFD-RS sets on the SpCell
- FFS: other scenarios
    Scenario 2: at least one TRP fails on SpCell
    Scenario 3: at least one pre-defined TRP fails on SpCell
    Scenario 4: at least one TRP fails and no PUCCH-SR is configured, and no UL grant is available
    Scenario 5: If MAC-CE based reporting does not work (details FFS)
    Scenario 6: When no PUCCH-SR is configured

TABLE 10-continued

Agreement
To associate BFD-RS set k and NBI-RS set j
- Alt-1: 1-to-1, fixed in spec
- Whether NBI-RS configuration is mandatory is separate discussion
Agreement
For the case of all CORESETs with 1 activated TCI state per CORESET, after 28 symbols
from receiving the BFR response, the QCL assumption of all CORESETs associated with
CORESETPoolIndex k (k=0,1) is updated by the RS resource associated with the latest
reported new candidate beam (if found) associated with the failed BFD -RS set k (k=0,1) in
the MAC-CE for TRP -specific BFR
- The above applies to Scell and SpCell
- The above applies for the multi-DCI case
Agreement
SCS of the 28 symbols is the smallest SCS of the active DL BWP for the response reception
CC and of the active DL BWP (s) of the CC(s) with the failed TRP link(s) reported in BFR
MAC CE.
Agreement
For RACH-based transmission, at least when all BFD-RS sets fail in SPCell, CBRA is
supported
Agreement
For implicit BFD RS configuration, if number of TCI states for CORESETs associated with a
CORESETPoolIndex exceeds the UE capability on maximum number of BFD-RS resources
per set, re-use the RLM-RS selection rule.
Agreement
On the PUCCH-SR resource/SR configurations selection rule when SR is triggered and 2
PUCCH-SR resource/SR configurations are configured, the UE triggers the PUCCH-SR
resource/SR configuration that is associated with failed BFD-RS set.
Agreement
Support to configure/update explicit BFD -RS set by RRC signaling and MAC CE signaling Referring to Table 10, for M-TRP BFR, 2 BFD (beam failure detection)-RS sets are supported per BWP, and a maximum of N (N is a natural number) resources are supported in each BFD-RS set.

In addition, for M-TRP beam failure recovery (BFR), one-to-one correspondence between each BFD-RS set and the NBI-RS set is supported.

In addition, for a beam failure recovery request (BFRQ) response, the same gNB response as in Rel.16 SCell BFR is supported (i.e., DCI with a toggled NDI scheduling the same HARQ process ID as a PUSCH carrying a BFRQ MAC-CE).

In addition, for a BFRQ of M-TRP BFR, up to two PUCCH-SR resources in a cell group are supported. In addition, a BFRQ MAC-CE capable of transmitting failed CC index information, one new candidate beam (if discovered) for a failed TRP/CC, and whether a new candidate beam is discovered is supported. At least a single TRP failure indication is supported.

In addition, for multiple TRP BFR, a single MAC-CE is used for at least BFRQ for all TRPs in all CCs of a cell group, which includes:

An index of a failed BFD-RS set (indication of failed TRP link)
An index of a CC including a failed TRP link
Based on an indicator of whether a new candidate beam is identified in an NBI-RS set associated with a failed BFD-RS set and the number of NBI-RS resources in the corresponding NBI-RS set, a resource indicator indicating a new candidate beam (if identified)

In addition, the maximum number of BFD-RS resources per set is UE capability including a possible candidate value 1 in Rel.17.

In addition, the following BFD-RS configurations are supported in Rel.17 for a UE with one active TCI state per CORESET.

In M-DCI, a BFD-RS set k (k=0, 1) is derived based on X TCIs of CORESETs with CORESETPoolIndex=k.

In addition, the following BFD-RS configurations are supported in Rel.17 for a UE with one active TCI state per CORESET.

Explicit configuration of BFD-RS resources in a BFD-RS set k, k=0, 1

In addition, RACH-based transmission may be triggered in an SpCell at least in the following scenario.

Scenario 1: When a beam error is detected in all BFD-RS sets of an SpCell

In addition, in order to associate a BFD-RS set k and an NBI-RS set j, one-to-one association.

In addition, for all CORESETs with one activated TCI state per CORESET, after 28 symbols of receiving a BFR response, a QCL assumption of all CORESETs associated with CORESETPoolIndex k (k=0, 1) is updated by an RS resource associated with the most recently reported new candidate beam (if found) associated with a failed BFD-RS set k (k=0, 1) in a MAC-CE for TRP specific BFR.

This applies to Scell and SpCell.

This applies in case of multiple DCI.

In addition, SCS of 28 symbols is the smallest SCS of active DL BWP(s) of CC(s) with failed TRP link(s) reported in a BFR MAC CE and an active DL BWP for a responding receiving CC.

In addition, for RACH-based transmission, CBRA is supported when at least all BFD-RS sets fail in an SPCell.

In addition, in the case of an implicit BFD RS configuration, if the number of TCI states for CORESETs associated with CORESETPoolIndex exceeds UE capability for the maximum number of BFD-RS resources per set, an RLM-RS selection rule is reused.

In addition, if a SR is triggered in a PUCCH-SR resource/SR configuration selection rule and two PUCCH-SR resources/SR configurations are configured, a UE triggers a PUCCH-SR resource/SR configuration associated with a failed BFD-RS set.

In addition, an explicit BFD-RS configuration/update set by RRC signaling and MAC CE signaling is supported.

In particular, as shown in Table 10 above, it was agreed that both an explicit configuration method and an implicit configuration method are supported in a TRP-specific BFD-RS configuration. Here, in an explicit BFD-RS configuration, it has been agreed that RRC signaling and/or MAC CE signaling be used to configure and/or update one or more BFD-RSs (or one or more BFD-RS resources) in a BFD-RS set.

However, when a base station configures specific TRP-specific BFD-RS(s) through RRC signaling (i.e., when a plurality of BFD-RS sets including one or more BFD-RSs are configured), there is a need for further discussion on whether a terminal needs to monitor/detect beam failure for corresponding resource(s) (i.e., BFD-RS resource), or a terminal needs to monitor/detect for activated resource(s) (i.e., BFD-RS resource) only after a base station transmits/receives an activation MAC CE for TRP-specific BFD-RS(s) configured through RRC signaling by a base station. A summary of the above discussion is given below.

Alternative (Alt) 1: A base station/terminal may consider BFD-RS(s) in a TRP-specific BFD-RS set configured through RRC signaling as a candidate list. In addition, a terminal does not monitor/detect the corresponding RS(s), and may monitor/detect activated RS(s) in the candidate list through MAC CE signaling.

Alternative 2: When there is one BFD-RS in a TRP-specific BFD-RS set configured through RRC signaling, a terminal may perform monitor/detect for the corresponding RS. If there are multiple (two or more) BFD-RSs in a BFD-RS set configured through RRC signaling, a terminal may not monitor/detect the corresponding RSs and wait for BFD-RS activation by MAC CE signaling. In addition, a terminal may monitor/detect the activated RS(s) after receiving the activation MAC CE.

Alternative 3: If the number of BFD-RSs in a TRP-specific BFD-RS set configured through RRC signaling is less than or equal to $N_{BFD}$ (the number of BFD-RSs configurable in a BFD-RS set (i.e., monitor/detect/tracking possible)) reported by a terminal as UE capability, the terminal may perform monitor/detect for the corresponding RS(s). If the number of BFD-RSs in a BFD-RS set configured through RRC signaling exceeds $N_{BFD}$, a terminal may have to wait for BFD-RS activation by MAC CE signaling without monitoring/detecting the corresponding RSs. And after receiving the activation MAC CE, monitor/detection can be performed on the activated RS(s).

In the case of Alt 1, a terminal may perform monitor/detect for beam failure detection (BFD) (i.e., BFI count) only for RS(s) (equal to or less than UE capability $N_{BFD}$ of the terminal) activated through MAC CE signaling among BFD-RS(s) in a BFD-RS set configured by RRC signaling.

In this case, when up to two BFD-RS sets are configured with RRC signaling in a specific CC/BWP and a plurality of BFD-RSs are also configured through RRC signaling in each BFD-RS set, MAC CE signaling for activating there is an issue as to whether MAC CE signaling for activating the BFD-RS (s) can perform activation only for BFD-RS(s) in a specific BFD-RS set among two BFD-RS sets. Due to this issue, if only BFD-RS(s) in a specific BFD-RS set among two BFD-RS sets are activated and a terminal performs BFD only for the corresponding BFD-RS set, when BF occurs in the corresponding BFD-RS set, a problem (problem 1) may occur in which ambiguity occurs as to whether the corresponding BF corresponds to TRP-specific BF or cell-specific BF.

Proposal 1 for Problem 1: A terminal has been configured with a plurality of (e.g., two) (explicit) BFD-RS sets (and/or BFD-RS(s) in the two BFD-RS set) in a specific CC/BWP, the terminal may expect that a plurality of (e.g., two) BFD-RS sets in the corresponding CC/BWP is simultaneously activated through a BFD-RS activation MAC CE message. And/or, such configuration/activation (i.e., when two BFD-RS sets are configured, two BFD-RS sets are simultaneously activated) may be mandatory for an operation between a base station and a terminal.

In other words, when a terminal is configured with a plurality of BFD-RS sets (and/or one or more BFD-RSs within a plurality of BFD-RS sets) for a specific CC/BWP, the terminal may expect that activation is indicated for all BFD-RS sets configured in the corresponding CC/BWP through a BFD-RS activation MAC CE message. And/or, an operation between a base station/terminal that all BFD-RS sets configured for a terminal in the corresponding CC/BWP as described above are activated together (simultaneously) through a BFD-RS activation MAC CE message may be mandatory.

In a CC/BWP in which a plurality of (e.g., two) BFD-RS sets are configured, since the plurality of (e.g., two) BFD-RS sets are always activated simultaneously through the operation of the proposal 1, the problem 1 can be solved.

In addition, in the case of Alt 2 and Alt 3, if the number of BFD-RSs configured by RRC signaling in a specific BFD-RS set in a specific CC/BWP is less than or equal to a specific threshold (1 in Alt 2, $N_{BFD}$ in Alt 3), a terminal may perform BFD on the corresponding BFD-RS set only by the RRC configuration (i.e., it may be considered that all BFD-RSs in the BFD-RS set configured by RRC signaling are activated). On the other hand, if it exceeds the threshold, a terminal may not perform BFD until some BFD-RS(s) (equal to or less than UE capability $N_{BFD}$) among RSs configured by RRC are activated (i.e., it may be considered that all BFD-RSs in the BFD-RS set configured by RRC signaling are deactivated), and the terminal may perform BFD on the activated BFD-RS(s) after receiving an activation MAC CE. However, in this case, in a specific CC/BWP, BFD-RSs below the threshold are configured by RRC signaling in a specific BFD-RS set among two BFD-RS sets, and BFD-RSs above the threshold are configured by RRC signaling in another BFD-RS set, a problem (problem 2) in which a terminal performs BFD on a specific BFD-RS set (BFD-RS set in which BFD-RSs below the threshold are configured by RRC signaling) and does not perform BFD on another BFD-RS set (BFD-RS in which BFD-RSs above the threshold is configured by RRC signaling) may occur.

Proposal 2 for Problem 2: When a terminal has been configured with two BFD-RS sets in a specific CC/BWP, even if the number of BFD-RSs configured by RRC signaling in a specific BFD-RS set exceeds a specific threshold, the terminal may perform BFD (i.e., monitor/detect for BFD) on specific BFD-RS(s) among BFD-RSs configured by RRC signaling. The specific BFD-RS(s) may correspond to the number of RS(s) equal to or less than the threshold in ascending order from an RS having the lowest global index/local index among RSs (e.g., periodic CSI-RS) configured as the BFD-RS. For example, for a BFD-RS set in which the number of BFD-RS(s) configured by RRC signaling is less than or equal to a specific threshold, a terminal may consider that all BFD-RSs in the corresponding BFD-RS set are activated and perform monitor/detect for BFD on the corresponding BFD-RS(s). In addition, for a BFD-RS set in which the number of BFD-RS(s) configured by RRC signaling exceeds a specific threshold, a terminal may perform monitor/detect for BFD for as many RS(s) as the number of RS(s) equal to or less than the threshold in the corresponding BFD-RS set.

A terminal may perform BFD (i.e., monitor/detect for BFD) in the same manner as in proposal 2 on the RRC-configured BFD-RS. In addition, when receiving a BFD-RS activation/deactivation MAC CE message from a base station, a terminal may update BFD-RS(s) for performing BFD in a specific BFD-RS set. Through the operation of proposal 2, a terminal may immediately perform TRP-specific BFD without ambiguity when receiving BFD-RSs for two BFD-RS sets by RRC signaling.

And/or, when a terminal has been configured with a plurality of (e.g., two) BFD-RS sets in a specific CC/BWP, if the number of BFD-RSs configured by RRC signaling in a specific BFD-RS set(s) exceeds a specific threshold, the terminal may not perform BFD for the specific BFD-RS set(s). In addition, a terminal may not perform BFD on other BFD-RS set(s) in which the number of BFD-RSs configured by RRC signaling is less than or equal to the threshold, and may wait for reception of a BFD-RS activation MAC CE message from a base station. That is, if the number of BFD-RSs in any one set among a plurality of BFD-RS sets configured by RRC signaling exceeds a specific threshold, a terminal may consider that all BFD-RSs are deactivated for all BFD-RS sets.

Here, an activation MAC CE may indicate down-selection (i.e., activation) only for BFD-RS set(s) in which the number of BFD-RSs configured by RRC signaling exceeds a specific threshold. Here, even if a base station does not activate a separate BFD-RS(s) in the MAC CE for other BFD-RS set(s) in which the number of BFD-RSs configured by RRC signaling is less than or equal to the threshold, a terminal receiving the MAC CE may understand/consider that BFD-RS(s) in the corresponding other BFD-RS set(s) (i.e., a BFD-RS set in which the number of BFD-RSs is less than or equal to the threshold) are automatically activated when the MAC CE signaling is activated (e.g., 3 ms after a terminal transmits A/N (acknowledgement/negative acknowledgment, ACK/NACK) for the corresponding MAC CE message).

And/or, when a terminal has been configured with a plurality of (e.g., two) BFD-RS sets in a specific CC/BWP, it may be expected that the number of BFD-RSs configured by RRC signaling in the plurality of BFD-RS sets is i) all equal to or less than a threshold or ii) all more than a threshold. In this case, for BFD-RS(s) configured by RRC signaling for a plurality of (e.g., two) BFD-RS sets, a terminal may i) perform BFD on all of the plurality (e.g., two) BFD-RS sets or ii) may not perform BFD on all of the plurality (e.g., two) BFD-RS sets (and/or may wait for a BFD-RS activation MAC CE message without performing).

Additionally, the above-described BFD-RS activation/deactivation MAC CE may activate/deactivate some of BFD-RSs configured in each BFD-RS set among two BFD-RS sets in a specific CC/BWP. By doing this, a terminal may update each BFD-RS set to perform BFD (for counting BFI). In this case, in order to update one or more BFD-RSs in a specific BFD-RS set, an operation of activating specific BFD-RS(s) in the corresponding set and deactivating other BFD-RS(s) may be performed. In this case, if each BFI was counted for two BFD-RSs in the specific BFD-RS set, when all or part of the two RSs are updated (i.e., changed), a problem (problem 3) in which an operation of a terminal calculating a BFI count becomes ambiguous occurs.

Proposal 3 to be described later is described with respect to one of BFD-RS sets for convenience of description, even if a plurality of BFD-RS sets are configured by RRC signaling. That is, proposal 3, which will be described later, may be individually applied to all of a plurality of BFD-RS sets configured by RRC signaling.

Proposal 3 for Problem 3: When a terminal receives a BFD-RS activation/deactivation MAC CE message for a specific BFD-RS set, for example, a terminal may stop a BFI count for the corresponding BFD-RS set and may resume the BFI count again from the time when MAC CE signaling is activated (e.g., 3 ms after a terminal transmits an A/N for the corresponding MAC CE message).

That is, when a terminal receives a BFD-RS activation/deactivation MAC CE message for one or more BFD-RSs for a specific BFD-RS set, the terminal may continue/persist the BFI count for one or more BFD-RSs updated (changed) by the MAC CE.

And/or, when a terminal receives a BFD-RS activation/deactivation MAC CE message for a specific BFD-RS set, the terminal may continue/persist a BFI count for the corresponding BFD-RS set. Here, if update (i.e., change) is performed on only some BFD-RSs in the corresponding BFD-RS set, the BFI count is continued/persisted by performing update on the corresponding some BFD-RSs (i.e., for the changed BFD-RS) (e.g., from the time when MAC CE signaling is activated).

In the example below (F=fail, S=success, assuming max value for BFI count is 3), when MAC CE signaling to update RS #1 to RS #3 at time 3 is activated, a terminal may apply RS #3 as a target BFD-RS to the BFI count of RS #1 at the corresponding time 3, and may continuously count the BFI within a time window.

time=1, 2, 3, 4 (BFI count=0)

RS #1=F, S, F, S→update/change RS #1 to RS #3 at time 3

RS #2=S, S, S, S

That is, while a BFI is counted for a specific BFD-RS, even if the BFD-RS is updated to another BFD-RS, a terminal may continuously perform the BFI count with the updated BFD-RS.

On the other hand, when receiving a BFD-RS activation/deactivation MAC CE message for a specific BFD-RS set, a terminal may continue/persist a BFI count for the corresponding BFD-RS set. Here, when update (i.e., change) is performed on all BFD-RSs in the corresponding BFD-RS set, a BFI count may be continued/persisted as shown in the example below (e.g., from when MAC CE signaling is activated).

In the example below, when MAC CE signaling for updating RS #1 and RS #2 to RS #3 and RS #4 at time 3 is activated, a combination of BFD-RSs before and after update is as follows. The RS with the lowest global/local index in the BFD-RS set may be replaced with the RS with the lowest global/local index in the BFD-RS set after update, and the RS with the highest global/local index in the BFD-RS set may be replaced with the RS with the highest global/local index in the BFD-RS set after update. That is, the BFD-RSs in the BFD-RS set may be updated (changed) so that an order of global/local indexes in a BFD-RS set before an update and an order of global/local indexes in a BFD-RS set after the update correspond (one-to-one).

And/or, in a combination of BFD-RSs before and after an update, the first RS in a BFD-RS set may be replaced with the first RS in the BFD-RS set after the update, and the second RS in the BFD-RS set may be replaced with the second RS in the BFD-RS set after the update. That is, BFD-RSs in a BFD-RS set may be updated (changed) so that a configuration order in the BFD-RS set before an update and a configuration order in the BFD-RS set after the update correspond (one-to-one).

time=1, 2, 3, 4 (BFI count=1)

RS #1=F, S, F, S→update/change RS #1 to RS #3 at time 3

RS #2=S, S, F, S→update/change RS #2 to RS #4 at time 3

That is, while a BFI is counted for one or more BFD-RSs in a specific BFD-RS set, even if all BFD-RSs in the BFD-RS set are updated with other BFD-RSs, a terminal may continuously perform the BFI count with the updated BFD-RSs.

A terminal and a base station may perform a BFD and/or BFR operation by individually applying the proposals 1, 2, and 3, and A terminal and a base station may perform a BFD and/or BFR operation by applying a combination of at least one or more of the proposals 1, 2, and 3.

Figure 9:
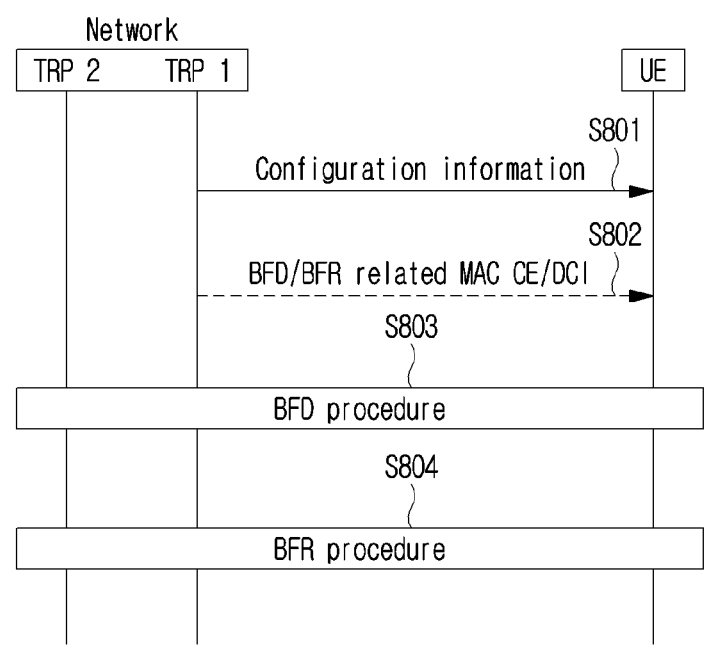
FIG. 9 illustrates a signaling method for an uplink transmission/reception method for beam failure recovery according to an embodiment of the present disclosure.

FIG. 9 illustrates a signaling method for an uplink transmission/reception method for beam failure recovery according to an embodiment of the present disclosure.

FIG. 9 illustrates signaling between a network (e.g., TRP 1, TRP 2) and a UE in a situation of multi-TRPs (multiple TRPs) (i.e., M-TRPs, or multiple cells, hereinafter, all TRPs may be replaced with a cell) that methods proposed in the present disclosure (e.g., proposal 1, proposal 2, proposal 3, any one or a combination of one or more detailed embodiments in the detailed embodiments for proposals 1 to 3) may be applied. Here, a UE/a network is just an example, and may be applied by being substituted with a variety of devices. FIG. 9 is just for convenience of a description, and does not limit a scope of the present disclosure. In addition, some step(s) illustrated in FIG. 9 may be omitted depending on circumstances and/or configurations.

In reference to FIG. 9, for convenience of a description, signaling between 2 TRPs and a UE is illustrated, but a corresponding signaling method may be extended and applied to signaling between a plurality of TRPs and a plurality of UEs. In the following description, a network may be one base station including a plurality of TRPs or may be one cell including a plurality of TRPs. In an example, an ideal/a non-ideal backhaul may be configured between TRP 1 and TRP 2 configuring a network. In addition, the following description is described based on a plurality of TRPs, but it may be equally extended and applied to transmission through a plurality of panels. In addition, in the present disclosure, an operation that a terminal receives a signal from TRP1/TRP2 may be interpreted/described (or may be an operation) as an operation that a terminal receives a signal from a network (through/with TRP1/2) and an operation that a terminal transmits a signal to TRP1/TRP2 may be interpreted/described (or may be an operation) as an operation that a terminal transmits a signal to a network (through/with TRP1/TRP2) or may be conversely interpreted/described.

In reference to FIG. 9, it is assumed that a UE receives configuration/DCI from a representative TRP (e.g., TRP 1) in an M-TRP situation (or cell, hereinafter all TRPs can be replaced by a cell/panel, or M-TRP can be assumed even when a plurality of CORESETs are configured from one TRP). This is only for convenience of description, and the method described below may be extended and applied even when a UE receives configuration/DCI from at least one TRP. As an example, the representative TRP may be a TRP for transmitting/transporting a system information block (SIB)/paging/random access (RA) related signal to a UE.

Meanwhile, although not shown in FIG. 9, a UE may report information on the maximum number of configurable BFD-RSs (i.e., $N_{BFD}$) per BFD-RS set to a network through/using TRP 1 (and/or TRP 2) as UE capability.

A UE may receive configuration information through/using TRP 1 (and/or TRP 2) from a Network (S901).

The configuration information may include information related to network configuration (e.g., TRP configuration)/information related to M-TRP-based transmission/reception (e.g., resource allocation, etc.). In this case, the configuration information may be transmitted through higher layer signaling (e.g., RRC signaling, MAC-CE, etc.).

For example, the configuration information may include configuration information related to a BFD procedure and/or a BFR procedure described in the above-described proposed methods (e.g., proposal 1, proposal 2, proposal 3, any one or a combination of one or more detailed embodiments in the detailed embodiments for proposals 1 to 3). As an example, the configuration information may include information on a CORESET/CORESET group(s) related to each TRP (e.g., CORESET group related TCI state(s) configuration/CORESET group identifier (ID), etc.). For example, the configuration information may include a CORESET configuration. As an example, the configuration information may include information on BFD RS(s)/BFD RS set(s) related to the BFD procedure, or, in some cases, BFD RS(s)/BFD RS set(s) may not be explicitly configured/indicated. As an example, the configuration information may include information on a plurality of reference signals (RSs) (i.e., a RS in which a QCL related to spatial reception parameter is configured or a QCL type D RS) for a spatial relation assumption (e.g., QCL relation) configured for a specific CORESET (/CORESET group). As an example, the configuration information may include configuration information for a BFRQ resource related to the BFR procedure.

For example, in a multi-TRP-based transmission/reception operation, the configuration information may include information on BFD RS(s)/BFD RS set(s) related to the BFD procedure related to each TRP (for a specific cell or cell group). In addition, the configuration information may include information on PUCCH resources related to the BFR procedure related to each TRP (for a specific cell or cell group) For example, the configuration information may include information on a first BFD RS set (including one or more RSs) corresponding to TRP 1 and a second BFD RS set (including one or more RSs) corresponding to TRP 2. Alternatively, the configuration information may not include explicit information on the first BFD RS set and the second BFD RS set. In this case, for example, a UE may determine the first BFD RS set and the second BFD RS set, respectively, including a QCL (quasi co-location) RS for a spatial reception parameter set in CORESETs having a different control resource set (CORESET) pool index. In addition, the configuration information may include information on a first PUCCH resource for BFR corresponding to TRP 1 and a second PUCCH resource for BFR corresponding to TRP 2 for a TRP-specific BFR procedure. In addition, the configuration information may include information on a PRACH resource for BFR for a cell-specific BFR procedure.

A UE may receive BFD/BFR related information through/using TRP 1 (and/or TRP 2) from a network through a MAC-CE and/or DCI (S902). For example, as in the above-described proposed methods (e.g., proposal 1, proposal 2, proposal 3, any one or a combination of one or more detailed embodiments in the detailed embodiments for proposals 1 to 3), a UE may receive information related to a BFD procedure and/or a BFR procedure through MAC-CE signaling and/or DCI.

Here, as in proposal 1 above, when a plurality of BFD-RS sets are configured for a terminal by the configuration information, one or more BFD-RSs may be activated for each of the plurality of BFD-RS sets by control information for activation of a BFD RS (e.g., BFD-RS activation MAC CE). Here, the control information for activation of the BFD RS may always indicate activation of all BFD RS sets (i.e., both the first BFD RS set and the second BFD RS set) configured (in a specific cell or cell group) for the terminal by the configuration information.

Alternatively, when a plurality of BFD-RS sets are configured for a terminal according to the configuration information, one or more BFD-RSs may be deactivated for each of the plurality of BFD-RS sets by control information for deactivation of a BFD RS (e.g., BFD-RS deactivation MAC CE).

The control information for activation of the BFD RS and the control information for deactivation of the BFD RS may be the same or may be defined separately.

A UE may perform a BFD procedure with a network (through/using TRP 1 and/or TRP 2) (S903). For example, a UE may perform a BFD procedure based on the above-described proposed methods (e.g., proposal 1, proposal 2, proposal 3, any one or a combination of one or more detailed embodiments in the detailed embodiments for proposals 1 to 3). For example, a UE may perform a BFD procedure based on a BFD RS.

A terminal may receive RSs included in each of a first BFD RS set (explicitly or implicitly configured) corresponding to a first TRP and/or a second BFD RS set (explicitly or implicitly configured) corresponding to a second TRP, and may assess radio link quality for the received RS. Here, assessing the radio link quality may mean comparing a hypothetical BLER (or SINR, RSRP) for each RS with a threshold as described above.

Here, according to the above proposals 1 to 3, when a terminal is configured with a first BFD set (corresponding to a first TRP) and a second BFD set (corresponding to a second TRP) and when one or more BFD RSs are activated in each of the first BFD RS set and the second BFD RS set by control information for activation or the configuration information, a terminal may assess the radio link quality using the activated one or more BFD RSs.

Here, according to the above proposal 1, when a plurality of BFD-RS sets are configured for a terminal according to the configuration information, one or more BFD-RSs may be activated for each of the plurality of BFD-RS sets by control information for activation of a BFD RS (e.g., BFD-RS activation MAC CE). Here, the control information for activation of the BFD RS always indicates activation of all BFD RS sets (i.e., both the first BFD RS set and the second BFD RS set) configured (in a specific cell or cell group) for a terminal by the configuration information.

Here, according to the above proposal 2, based on whether the number of BFD RSs is configured to exceed a specific number for at least one of the first BFD RS set and the second BFD RS set by the configuration information, whether to activate the one or more BFD RSs in the first BFD RS set and the second BFD RS set may be determined, respectively. For example, the specific number may be the maximum number of configurable BFD RSs per BFD RS set reported to the base station as a terminal capability.

Here, when the number of BFD RSs for each of the first BFD RS set and the second BFD RS set is configured not to exceed the specific number by the configuration information, all BFD RSs in the first BFD RS set and the second BFD RS set may be considered as activated.

In addition, when the number of BFD RSs for at least one of the first BFD RS set and the second BFD RS set is configured to exceed the specific number by the configuration information, all BFD RSs in the first BFD RS set and the second BFD RS set may be considered as deactivated. In this case, one or more BFD RSs may be activated in each of the first BFD RS set and the second BFD RS set by the control information for activation of the BFD RS.

In addition, if the number of BFD RSs is configured to exceed a specific number for at least one of the first BFD RS set and the second BFD RS set by the configuration information, one or more specific BFD-RSs for the corresponding BFD-RS set (i.e., the first BFD RS set and/or the second BFD RS set configured to exceed a specific number) may be considered as activated. For example, the one or more specific BFD-RSs may be determined as a specific number of BFD-RSs in ascending order from the lowest index of the BFD-RS.

A terminal may count a first BFI and a second BFI, respectively, according to assessment of radio link quality (when the radio link quality is worse than a predefined threshold, a BFI value is incremented by 1). And, when the count value for the first BFI and/or the count value for the second BFI reaches the maximum value, the terminal may determine that a first beam failure and/or a second beam failure is detected. That is, a terminal may individually assess radio link quality for each TRP, individually count a BFI for each TRP, and individually determine whether beam failure is detected for each TRP.

As described above, when a BFI for a specific TRP (i.e., for a specific BFD RS set) reaches the maximum value, a terminal may determine that beam failure has been detected for the corresponding TRP (i.e., for a specific BFD RS set). Here, if a plurality of BFD RSs in a BFD RS set for a specific TRP are configured (or activated as the proposals), when the BFI for all configured/activated BFD RSs reaches the maximum value, a terminal may determine that beam failure for the corresponding TRP (i.e., for the corresponding BFD RS set) has been detected.

Here, while performing a beam failure instance (BFI) count for one or more first BFD-RSs of at least one of the first BFD RS set and the second BFD RS set, the one or more first BFD-RSs may be updated to one or more second BFD-RSs by the control information for activation of the BFD RS. In this case, according to proposal 3 above, a terminal may continue the BFI count for the one or more first BFD-RSs for the updated one or more second BFD-RSs.

Thereafter, a UE may perform a BFR procedure with a Network (through/using TRP 1 and/or TRP 2) (S904). For example, a UE may perform the BFR procedure based on the above-described proposed methods (e.g., proposal 1, proposal 2, proposal 3, any one or a combination of one or more detailed embodiments in the detailed embodiments for proposals 1 to 3).

As described above, a terminal may individually determine detection of beam failure for each TRP. In addition, a BFR procedure may be performed for each TRP in which the beam failure is detected. When at least one of the first beam failure and the second beam failure is detected, a terminal may perform the uplink transmission (i.e., a BFR request or a link recovery request or a scheduling request for BFR) on a corresponding PUCCH resource among the first PUCCH resource (i.e., corresponding to a first TRP or corresponding to a first BFD RS set) and the second PUCCH resource (i.e., corresponding to a second TRP or corresponding to a second BFD RS set).

A beam failure may be declared by a terminal having assessed radio link quality in the above methods, and the uplink transmission (i.e., a BFR request or a link recovery request or a scheduling request for BFR) may be performed. In addition, a network receiving the uplink transmission (i.e., a BFR request or a link recovery request or a scheduling request for BFR) may perform beam recovery for each TRP or each cell (or CC) through various processes for beam recovery such as beam RS transmission, beam reporting request, etc.

Figure 10:
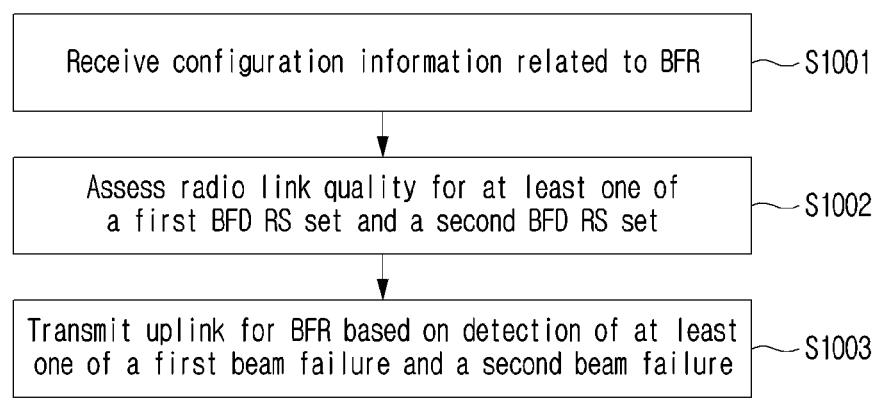
FIG. 10 is a diagram illustrating an operation of a terminal in a method for uplink transmission for beam failure recovery according to an embodiment of the present disclosure.

FIG. 10 is a diagram illustrating an operation of a terminal in a method for uplink transmission for beam failure recovery according to an embodiment of the present disclosure.

In FIG. 10, an operation of a terminal based on the previously proposed methods (e.g., proposal 1, proposal 2, proposal 3, any one or a combination of one or more detailed embodiments in the detailed embodiments for proposals 1 to 3) is exemplified. The example of FIG. 10 is for convenience of description, and does not limit the scope of the present disclosure. Some step(s) illustrated in FIG. 10 may be omitted depending on circumstances and/or configurations. In addition, a terminal in FIG. 10 is only one example, and may be implemented as the device illustrated in FIG. 12 below. For example, the processor 102/202 of FIG. 12 may control to transmit/receive a channel/signal/data/information, etc. using the transceiver 106/206, and may control to store a transmitted or received channel/signal/data/information, etc. may be controlled in the memory 104/204.

Figure 12:
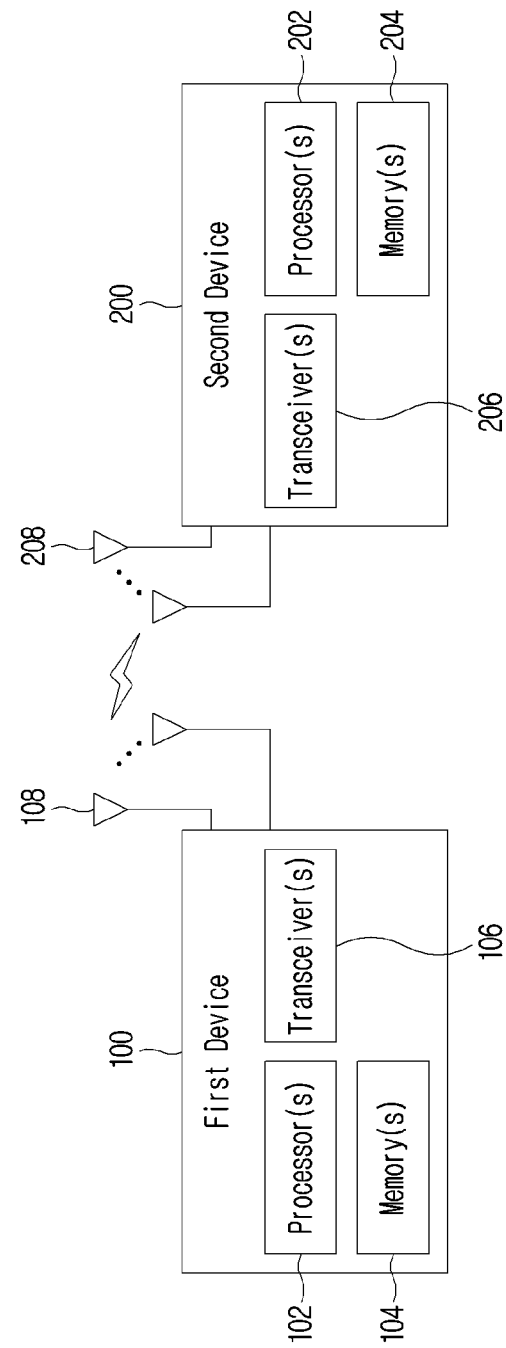
FIG. 12 illustrates a block diagram of a wireless communication device according to an embodiment of the present disclosure.

In addition, the operations of FIG. 10 may be processed by one or more processors 102, 202 of FIG. 12, and the operations of FIG. 10 may be stored in a memory (e.g., one or more memories 104, 204 of FIG. 12) in the form of instructions/programs (e.g., instruction, executable code) for driving at least one processor (e.g., 102 and 202) of FIG. 12.

Meanwhile, although not shown in FIG. 10, a terminal may report information on the maximum number of configurable BFD-RSs (i.e., $N_{BFD}$) per BFD-RS set to a base station as UE capability.

In reference to FIG. 10, a terminal may receive configuration information related to BFR from a base station (S1001).

The configuration information may include configuration information related to a BFD procedure and/or a BFR procedure described in the above-described proposed methods (e.g., proposal 1, proposal 2, proposal 3, any one or a combination of one or more detailed embodiments in the detailed embodiments for proposals 1 to 3). As an example, the configuration information may include information on a CORESET/CORESET group(s) related to each TRP (e.g., CORESET group related TCI state(s) configuration/CORESET group identifier (ID), etc.). For example, the configuration information may include a CORESET configuration. As an example, the configuration information may include information on BFD RS(s)/BFD RS set(s) related to the BFD procedure, or, in some cases, BFD RS(s)/BFD RS set(s) may not be explicitly configured/indicated. As an example, the configuration information may include information on a plurality of reference signals (RSs) (i.e., a RS in which a QCL related to spatial reception parameter is configured or a QCL type D RS for a spatial relation assumption (e.g., QCL relation) configured for a specific CORESET (/CORESET group). As an example, the configuration information may include configuration information for a BFRQ resource related to the BFR procedure.

For example, in a multi-TRP-based transmission/reception operation, the configuration information may include information on BFD RS(s)/BFD RS set(s) related to the BFD procedure related to each TRP (for a specific cell or cell group). In addition, the configuration information may include information on PUCCH resources related to the BFR procedure related to each TRP (for a specific cell or cell group) For example, the configuration information may include information on a first BFD RS set (including one or more RSs) corresponding to TRP 1 and a second BFD RS set (including one or more RSs) corresponding to TRP 2. Alternatively, the configuration information may not include explicit information on the first BFD RS set and the second BFD RS set. In this case, for example, a UE may determine the first BFD RS set and the second BFD RS set, respectively, including a QCL (quasi co-location) RS for a spatial reception parameter set in CORESETs having a different CORESET pool index. In addition, the configuration information may include information on a first PUCCH resource for BFR corresponding to TRP 1 and a second PUCCH resource for BFR corresponding to TRP 2 for a TRP-specific BFR procedure. In addition, the configuration information may include information on a PRACH resource for BFR for a cell-specific BFR procedure.

Meanwhile, although not shown in FIG. 10, a terminal may receive information related to a BFD procedure and/or a BFR procedure from a base station through MAC-CE signaling and/or DCI.

Here, as in proposal 1 above, when a plurality of BFD-RS sets are configured for a terminal by the configuration information, one or more BFD-RSs may be activated for each of the plurality of BFD-RS sets by control information for activation of a BFD RS (e.g., BFD-RS activation MAC CE). Here, the control information for activation of the BFD RS may always indicate activation of all BFD RS sets (i.e., both the first BFD RS set and the second BFD RS set) configured (in a specific cell or cell group) for the terminal by the configuration information.

Alternatively, when a plurality of BFD-RS sets are configured for a terminal according to the configuration information, one or more BFD-RSs may be deactivated for each of the plurality of BFD-RS sets by control information for deactivation of a BFD RS (e.g., BFD-RS deactivation MAC CE).

The control information for activation of the BFD RS and the control information for deactivation of the BFD RS may be the same or may be defined separately.

A terminal performs an assessment of radio link quality for at least one of a first BFD RS set and a second BFD RS set (S1002).

For example, an assessment of the radio link quality may be performed based on the above-described proposed methods (e.g., proposal 1, proposal 2, proposal 3, any one or a combination of one or more detailed embodiments in the detailed embodiments for proposals 1 to 3).

A terminal may receive RSs included in each of a first BFD RS set (explicitly or implicitly configured) corresponding to a first TRP and/or a second BFD RS set (explicitly or implicitly configured) corresponding to a second TRP, and may assess radio link quality for the received RS. Here, assessing the radio link quality may mean comparing a hypothetical BLER (or SINR, RSRP) for each RS with a threshold as described above.

Here, according to the above proposals 1 to 3, when a terminal is configured with a first BFD set (corresponding to a first TRP) and a second BFD set (corresponding to a second TRP) and when one or more BFD RSs are activated in each of the first BFD RS set and the second BFD RS set by control information for activation or the configuration information, a terminal may assess the radio link quality using the activated one or more BFD RSs.

Here, according to the above proposal 1, when a plurality of BFD-RS sets are configured for a terminal according to the configuration information, one or more BFD-RSs may be activated for each of the plurality of BFD-RS sets by control information for activation of a BFD RS (e.g., BFD-RS activation MAC CE). Here, the control information for activation of the BFD RS always indicates activation of all BFD RS sets (i.e., both the first BFD RS set and the second BFD RS set) configured (in a specific cell or cell group) for a terminal by the configuration information.

Here, according to the above proposal 2, based on whether the number of BFD RSs is configured to exceed a specific number for at least one of the first BFD RS set and the second BFD RS set by the configuration information, whether to activate the one or more BFD RSs in the first BFD RS set and the second BFD RS set may be determined, respectively. For example, the specific number may be the maximum number of configurable BFD RSs per BFD RS set reported to the base station as a terminal capability.

Here, when the number of BFD RSs for each of the first BFD RS set and the second BFD RS set is configured not to exceed the specific number by the configuration information, all BFD RSs in the first BFD RS set and the second BFD RS set may be considered as activated.

In addition, when the number of BFD RSs for at least one of the first BFD RS set and the second BFD RS set is configured to exceed the specific number by the configuration information, all BFD RSs in the first BFD RS set and the second BFD RS set may be considered as deactivated. In this case, one or more BFD RSs may be activated in each of the first BFD RS set and the second BFD RS set by the control information for activation of the BFD RS.

In addition, if the number of BFD RSs is configured to exceed a specific number for at least one of the first BFD RS set and the second BFD RS set by the configuration information, one or more specific BFD-RSs for the corresponding BFD-RS set (i.e., the first BFD RS set and/or the second BFD RS set configured to exceed a specific number) may be considered as activated. For example, the one or more specific BFD-RSs may be determined as a specific number of BFD-RSs in ascending order from the lowest index of the BFD-RS.

Based on detection of at least one of a first beam failure for a first BFD RS set and a second beam failure for a second BFD RS set according to an assessment of radio link quality for at least one of the first BFD RS set and the second BFD RS set, a terminal performs uplink transmission for BFR to a base station (S1003).

For example, a terminal may perform a BFD procedure and a BFR procedure based on the above-described proposed methods (e.g., proposal 1, proposal 2, proposal 3, any one or a combination of one or more detailed embodiments in the detailed embodiments for proposals 1 to 3).

A terminal may receive RSs included in each of a first BFD RS set (explicitly or implicitly configured) corresponding to a first TRP and/or a second BFD RS set (explicitly or implicitly configured) corresponding to a second TRP, and may assess radio link quality for the received RS. In addition, a terminal may count a first BFI and a second BFI, respectively, according to assessment of radio link quality (when the radio link quality is worse than a predefined threshold, a BFI value is incremented by 1). And, when the count value for the first BFI and/or the count value for the second BFI reaches the maximum value, the terminal may determine that a first beam failure and/or a second beam failure is detected. That is, a terminal may individually assess radio link quality for each TRP, individually count a BFI for each TRP, and individually determine whether beam failure is detected for each TRP. In addition, when at least one of the first beam failure and the second beam failure is detected, a terminal may perform the uplink transmission (i.e., a BFR request or a link recovery request or a scheduling request for BFR) on a corresponding PUCCH resource among the first PUCCH resource and the second PUCCH resource.

As described above, when a BFI for a specific TRP (i.e., for a specific BFD RS set) reaches the maximum value, a terminal may determine that beam failure has been detected for the corresponding TRP (i.e., for a specific BFD RS set). Here, if a plurality of BFD RSs in a BFD RS set for a specific TRP are configured (or activated as the proposals), when the BFI for all configured/activated BFD RSs reaches the maximum value, a terminal may determine that beam failure for the corresponding TRP (i.e., for the corresponding BFD RS set) has been detected.

Here, while performing a beam failure instance (BFI) count for one or more first BFD-RSs of at least one of the first BFD RS set and the second BFD RS set, the one or more first BFD-RSs may be updated to one or more second BFD-RSs by the control information for activation of the BFD RS. In this case, according to proposal 3 above, a terminal may continue the BFI count for the one or more first BFD-RSs for the updated one or more second BFD-RSs.

As described above, a terminal may individually determine detection of beam failure for each TRP. In addition, a BFR procedure may be performed for each TRP in which the beam failure is detected. When at least one of the first beam failure and the second beam failure is detected, a terminal may perform the uplink transmission (i.e., a BFR request or a link recovery request or a scheduling request for BFR) on a corresponding PUCCH resource among the first PUCCH resource (i.e., corresponding to a first TRP or corresponding to a first BFD RS set) and the second PUCCH resource (i.e., corresponding to a second TRP or corresponding to a second BFD RS set).

Meanwhile, after transmitting the uplink, a terminal may receive DCI for PUSCH scheduling from a base station. In this case, a terminal may transmit a MAC-CE for BFR to a base station through a PUSCH. Here, the MAC-CE for BFR may include at least one of an index of a cell in which beam failure is detected, information on whether a new beam is found, new beam information, and an index of a BFD RS set in which beam failure is detected.

A beam failure may be declared by a terminal having assessed radio link quality in the above methods, and the uplink transmission (i.e., a BFR request or a link recovery request) may be performed. In addition, a base station receiving the uplink transmission (i.e., a BFR request or a link recovery request) may perform beam recovery for each TRP or each cell (or CC) through various processes for beam recovery such as beam RS transmission, beam reporting request, etc.

Figure 11:
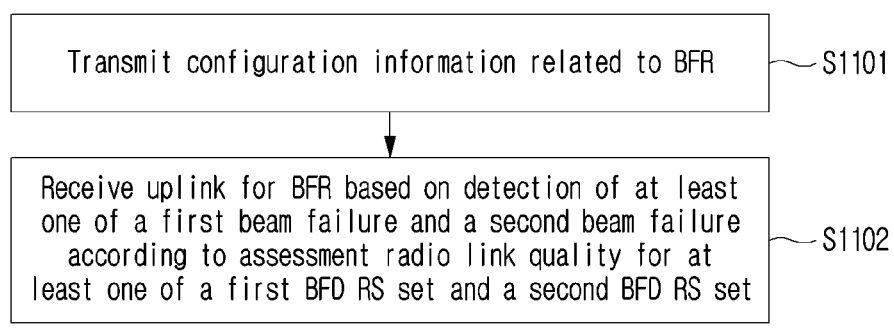
FIG. 11 is a diagram illustrating an operation of a base station for a method of uplink transmission for beam failure recovery according to an embodiment of the present disclosure.

FIG. 11 is a diagram illustrating an operation of a base station for a method of uplink transmission for beam failure recovery according to an embodiment of the present disclosure.

In reference to FIG. 11, in FIG. 10, an operation of a base station based on the previously proposed methods (e.g., proposal 1, proposal 2, proposal 3, any one or a combination of one or more detailed embodiments in the detailed embodiments for proposals 1 to 3) is exemplified. The example of FIG. 11 is for convenience of description, and does not limit the scope of the present disclosure. Some step(s) illustrated in FIG. 11 may be omitted depending on circumstances and/or configurations. In addition, a base station in FIG. 11 is only one example, and may be implemented as the device illustrated in FIG. 12 below. For example, the processor 102/202 of FIG. 12 may control to transmit/receive a channel/signal/data/information, etc. using the transceiver 106/206, and may control to store a transmitted or received channel/signal/data/information, etc. may be controlled in the memory 104/204.

In addition, the operations of FIG. 11 may be processed by one or more processors 102, 202 of FIG. 12, and the operations of FIG. 11 may be stored in a memory (e.g., one or more memories 104, 204 of FIG. 12) in the form of instructions/programs (e.g., instruction, executable code) for driving at least one processor (e.g., 102 and 202) of FIG. 12.

Meanwhile, although not shown in FIG. 11, a base station may receive information on the maximum number of configurable BFD-RSs (i.e., $N_{BFD}$) per BFD-RS set from a terminal as UE capability.

In reference to FIG. 11, a base station may transmit configuration information related to BFR to a terminal (S1101).

The configuration information may include configuration information related to a BFD procedure and/or a BFR procedure described in the above-described proposed methods (e.g., proposal 1, proposal 2, proposal 3, any one or a combination of one or more detailed embodiments in the detailed embodiments for proposals 1 to 3). As an example, the configuration information may include information on a CORESET/CORESET group(s) related to each TRP (e.g., CORESET group related TCI state(s) configuration/CORESET group identifier (ID), etc.). For example, the configuration information may include a CORESET configuration. As an example, the configuration information may include information on BFD RS(s)/BFD RS set(s) related to the BFD procedure, or, in some cases, BFD RS(s)/BFD RS set(s) may not be explicitly configured/indicated. As an example, the configuration information may include information on a plurality of reference signals (RSs) (i.e., a RS in which a QCL related to spatial reception parameter is configured or a QCL type D RS) for a spatial relation assumption (e.g., QCL relation) configured for a specific CORESET (/CORESET group). As an example, the configuration information may include configuration information for a BFRQ resource related to the BFR procedure.

For example, in a multi-TRP-based transmission/reception operation, the configuration information may include information on BFD RS(s)/BFD RS set(s) related to the BFD procedure related to each TRP (for a specific cell or cell group). In addition, the configuration information may include information on PUCCH resources related to the BFR procedure related to each TRP (for a specific cell or cell group) For example, the configuration information may include information on a first BFD RS set (including one or more RSs) corresponding to TRP 1 and a second BFD RS set (including one or more RSs) corresponding to TRP 2. Alternatively, the configuration information may not include explicit information on the first BFD RS set and the second BFD RS set. In this case, for example, a UE may determine the first BFD RS set and the second BFD RS set, respectively, including a QCL (quasi co-location) RS for a spatial reception parameter set in CORESETs having a different CORESET pool index. In addition, the configuration information may include information on a first PUCCH resource for BFR corresponding to TRP 1 and a second PUCCH resource for BFR corresponding to TRP 2 for a TRP-specific BFR procedure. In addition, the configuration information may include information on a PRACH resource for BFR for a cell-specific BFR procedure.

Meanwhile, although not shown in FIG. 11, a base station may transmit information related to a BFD procedure and/or a BFR procedure to a terminal through MAC-CE signaling and/or DCI.

Here, as in proposal 1 above, when a plurality of BFD-RS sets are configured for a terminal by the configuration information, one or more BFD-RSs may be activated for each of the plurality of BFD-RS sets by control information for activation of a BFD RS (e.g., BFD-RS activation MAC CE). Here, the control information for activation of the BFD RS may always indicate activation of all BFD RS sets (i.e., both the first BFD RS set and the second BFD RS set) configured (in a specific cell or cell group) for the terminal by the configuration information.

Alternatively, when a plurality of BFD-RS sets are configured for a terminal according to the configuration information, one or more BFD-RSs may be deactivated for each of the plurality of BFD-RS sets by control information for deactivation of a BFD RS (e.g., BFD-RS deactivation MAC CE).

The control information for activation of the BFD RS and the control information for deactivation of the BFD RS may be the same or may be defined separately.

Based on detection of at least one of a first beam failure for a first BFD RS set and a second beam failure for a second BFD RS set according to an assessment of radio link quality for at least one of the first BFD RS set and the second BFD RS set, a base station receives uplink transmission for BFR from a terminal (S1102).

For example, the BFD procedure and the BFR procedure may be performed based on the above-described proposed methods (e.g., proposal 1, proposal 2, proposal 3, any one or a combination of one or more detailed embodiments in the detailed embodiments for proposals 1 to 3).

A base station may transmit RSs included in each of a first BFD RS set (explicitly or implicitly configured) corresponding to a first TRP and/or a second BFD RS set (explicitly or implicitly configured) corresponding to a second TRP to a terminal, and radio link quality for the received RS may be assessed by the terminal. Here, assessing the radio link quality may mean comparing a hypothetical BLER (or SINR, RSRP) for each RS with a threshold as described above.

Here, according to the above proposals 1 to 3, when a terminal is configured with a first BFD set (corresponding to a first TRP) and a second BFD set (corresponding to a second TRP) and when one or more BFD RSs are activated in each of the first BFD RS set and the second BFD RS set by control information for activation or the configuration information, the radio link quality may be assess using the activated one or more BFD RSs by a terminal.

Here, according to the above proposal 1, when a plurality of BFD-RS sets are configured for a terminal according to the configuration information, one or more BFD-RSs may be activated for each of the plurality of BFD-RS sets by control information for activation of a BFD RS (e.g., BFD-RS activation MAC CE). Here, the control information for activation of the BFD RS always indicates activation of all BFD RS sets (i.e., both the first BFD RS set and the second BFD RS set) configured (in a specific cell or cell group) for a terminal by the configuration information.

Here, according to the above proposal 2, based on whether the number of BFD RSs is configured to exceed a specific number for at least one of the first BFD RS set and the second BFD RS set by the configuration information, whether to activate the one or more BFD RSs in the first BFD RS set and the second BFD RS set may be determined, respectively. For example, the specific number may be the maximum number of configurable BFD RSs per BFD RS set reported to the base station as a terminal capability.

Here, when the number of BFD RSs for each of the first BFD RS set and the second BFD RS set is configured not to exceed the specific number by the configuration information, all BFD RSs in the first BFD RS set and the second BFD RS set may be considered as activated.

In addition, when the number of BFD RSs for at least one of the first BFD RS set and the second BFD RS set is configured to exceed the specific number by the configuration information, all BFD RSs in the first BFD RS set and the second BFD RS set may be considered as deactivated. In this case, one or more BFD RSs may be activated in each of the first BFD RS set and the second BFD RS set by the control information for activation of the BFD RS.

In addition, if the number of BFD RSs is configured to exceed a specific number for at least one of the first BFD RS set and the second BFD RS set by the configuration information, one or more specific BFD-RSs for the corresponding BFD-RS set (i.e., the first BFD RS set and/or the second BFD RS set configured to exceed a specific number) may be considered as activated. For example, the one or more specific BFD-RSs may be determined as a specific number of BFD-RSs in ascending order from the lowest index of the BFD-RS.

In addition, a first BFI and a second BFI may be counted, respectively, according to an assessment of radio link quality by a terminal (when the radio link quality is worse than a predefined threshold, a BFI value is incremented by 1). And, when the count value for the first BFI and/or the count value for the second BFI reaches the maximum value, it may be determined that a first beam failure and/or a second beam failure is detected by a terminal. That is, radio link quality is individually assessed for each TRP by a terminal, a BFI is individually counted for each TRP by a terminal, and whether beam failure is detected by a terminal may be individually determined for each TRP.

As described above, when a BFI for a specific TRP (i.e., for a specific BFD RS set) reaches the maximum value, it may be determined that beam failure has been detected for the corresponding TRP (i.e., for a specific BFD RS set) by a terminal. Here, if a plurality of BFD RSs in a BFD RS set for a specific TRP are configured (or activated as the proposals), when the BFI for all configured/activated BFD RSs reaches the maximum value, it may be determined that beam failure for the corresponding TRP (i.e., for the corresponding BFD RS set) has been detected by a terminal.

Here, while performing a beam failure instance (BFI) count for one or more first BFD-RSs of at least one of the first BFD RS set and the second BFD RS set, the one or more first BFD-RSs may be updated to one or more second BFD-RSs by the control information for activation of the BFD RS. In this case, according to proposal 3 above, a terminal may continue the BFI count for the one or more first BFD-RSs for the updated one or more second BFD-RSs.

As described above, a terminal may individually determine detection of beam failure for each TRP. In addition, a BFR procedure may be performed for each TRP in which the beam failure is detected. When at least one of the first beam failure and the second beam failure is detected, a base station may receive the uplink transmission (i.e., a BFR request or a link recovery request or a scheduling request for BFR) on a corresponding PUCCH resource among the first PUCCH resource and the second PUCCH resource.

Meanwhile, after receiving the uplink, a base station may transmit DCI for PUSCH scheduling to a terminal. In this case, a base station may receive a MAC-CE for BFR from a terminal through a PUSCH. Here, the MAC-CE for BFR may include at least one of an index of a cell in which beam failure is detected, information on whether a new beam is found, new beam information, and an index of a BFD RS set in which beam failure is detected.

A beam failure may be declared by a terminal having assessed radio link quality in the above methods, and the uplink transmission (i.e., a BFR request or a link recovery request) may be performed. In addition, a base station receiving the uplink transmission (i.e., a BFR request or a link recovery request) may perform beam recovery for each TRP or each cell (or CC) through various processes for beam recovery such as beam RS transmission, beam reporting request, etc.

General Device to which the Present Disclosure May be Applied

FIG. 12 is a diagram which illustrates a block diagram of a wireless communication device according to an embodiment of the present disclosure.

In reference to FIG. 12, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:
1. A method comprising:
receiving, from a base station, configuration information, wherein the configuration information includes information related to a first reference signal (RS) set and a second RS set;
assessing radio link quality for at least one of the first RS set and the second RS set; and
based on the radio link quality for at least one of the first RS set and the second RS set being worse than a predetermined threshold, performing uplink transmission for radio link recovery to the base station,
wherein all RSs for each of the first RS set and the second RS set are activated based on at most N (N is an integer greater than 0) RSs are configured for the each of the first RS set and the second RS set, otherwise all RSs in the each of the first RS set and the second RS set are deactivated.
2. The method of claim 1,
wherein the N is a number of configurable maximum RSs per RS set reported to the base station as terminal capability.
3. The method of claim 1, further comprising:
receiving control information for activation,
wherein one or more RSs are used to assess the radio link quality in the each of at least one of the first RS set and the second RS set in which all RSs are not used to assess the radio link quality by the control information.
4. The method of claim 3,
wherein the control information always indicates that both the first RS set and the second RS set configured for a terminal by the configuration information are used to assess the radio link quality.
5. The method of claim 3,
wherein while performing a count for one or more first RSs of at least one of the first RS set and the second RS set, based on the one or more first RSs being updated to one or more second RSs by the control information, the count for the one or more first RSs is continued for the updated one or more second RSs.
6. A terminal comprising:
at least one transceiver for transmitting and receiving a wireless signal; and
at least one processor for controlling the at least one transceiver, wherein the at least one processor configured to:
receive, from a base station, configuration information, wherein the configuration information includes information related to a first reference signal (RS) set and a second RS set;
assess radio link quality for at least one of the first RS set and the second RS set; and
based on the radio link quality for at least one of the first RS set and the second RS set being worse than a predetermined threshold, perform uplink transmission for radio link recovery to the base station,
wherein all RSs for each of the first RS set and the second RS set are activated based on at most N (N is an integer greater than 0) RSs are configured for the each of the first RS set and the second RS set, otherwise all RSs in the each of the first RS set and the second RS set are deactivated.

7. A method of comprising:
transmitting, to a terminal, configuration information, wherein the configuration information includes information related to a first reference signal (RS) set and a second RS set; and
based on radio link quality for at least one of the first RS set and the second RS set being worse than a predetermined threshold according to assessment the radio link quality for at least one of the first RS set and the second RS set by the terminal, receiving uplink transmission for radio link recovery from the terminal,
wherein all RSs for each of the first RS set and the second RS set are activated based on at most N (N is an integer greater than 0) RSs are configured for the each of the first RS set and the second RS set, otherwise all RSs in the each of the first RS set and the second RS set are deactivated.

* * * * *